US011924442B2

(12) United States Patent
Hindriks et al.

(10) Patent No.: US 11,924,442 B2
(45) Date of Patent: Mar. 5, 2024

(54) GENERATING AND DISPLAYING A VIDEO STREAM BY OMITTING OR REPLACING AN OCCLUDED PART

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hendrikus Nathaniël Hindriks, The Hague (NL); Alexandre de Silva Pratas Gabriel, The Hague (NL); Hans Maarten Stokking, Wateringen (NL)

(73) Assignees: KONINKLIJKE KPN N.V., Rotterdam (NL); NEDERLANDSE ORGANISATIE VOOR TOEGEPAST-NATUURWETENSCHAPPELIJK, 'S-Gravenhage (NL)

( * ) Notice: Subject to any disclaimer, the term of this patent is extended or adjusted under 35 U.S.C. 154(b) by 158 days.

(21) Appl. No.: 16/683,003

(22) Filed: Nov. 13, 2019

(65) Prior Publication Data

US 2020/0162745 A1 May 21, 2020

(30) Foreign Application Priority Data

Nov. 20, 2018 (EP) .................................. 18207249

(51) Int. Cl.
*H04N 7/12* (2006.01)
*G06T 15/40* (2011.01)
(Continued)

(52) U.S. Cl.
CPC ........... *H04N 19/167* (2014.11); *G06T 15/40* (2013.01); *H04N 19/27* (2014.11); *H04N 19/46* (2014.11)

(58) Field of Classification Search
CPC ............................ H04N 19/167; H04N 19/46
See application file for complete search history.

(56) References Cited

U.S. PATENT DOCUMENTS 6,574,360 B1  6/2003  Berdardini et al.
10,397,666 B2  8/2019  Thomas
(Continued)

FOREIGN PATENT DOCUMENTS

EP  2 408 193 A2  1/2012
WO  2006/115716 A3  11/2006
(Continued)

OTHER PUBLICATIONS

Extended European Search Report for EP Application No. 18207249. 6, entitled "Generating and Displaying a Video Stream," dated Feb. 4, 2019.

(Continued)

*Primary Examiner* — Y Lee
(74) *Attorney, Agent, or Firm* — Hamilton, Brook, Smith & Reynolds, P.C.

(57) ABSTRACT

An encoder system and computer-implemented method may be provided for generating a video stream for a streaming client. The system and method may determine a part of the video which is or would be occluded during display of the video by the streaming client, for example on the basis of signaling data received from the streaming client. A video stream may be generated by, before or as part of encoding of the video, omitting the part of the video, or replacing video data in the part by replacement video data having a lower entropy than said video data. The video stream may be provided to the streaming client, for example via a network. Accordingly, a better compressible version of the video may
(Continued)

be obtained, which when displayed by the streaming client, may still contain all or most non-occluded parts visible to a user.

6 Claims, 16 Drawing Sheets

(51) Int. Cl.
*H04N 19/167* (2014.01)
*H04N 19/27* (2014.01)
*H04N 19/46* (2014.01)

(56) References Cited

U.S. PATENT DOCUMENTS

| | | | |
|---|---|---|---|
| 10,674,185 | B2 | 6/2020 | Thomas |
| 10,694,192 | B2 | 6/2020 | Thomas |
| 10,715,843 | B2 | 7/2020 | Van Brandenburg |
| 10,721,530 | B2 | 7/2020 | Van Brandenburg |
| 11,516,521 | B2 | 11/2022 | Da Silva Pratas Gabriel et al. |
| 2008/0168512 | A1 | 7/2008 | Nguyen |
| 2008/0212942 | A1 | 9/2008 | Gordon et al. |
| 2012/0169923 | A1 | 7/2012 | Millar et al. |
| 2015/0281698 | A1 | 10/2015 | Zhao et al. |
| 2016/0180579 | A1 | 6/2016 | Liao et al. |
| 2017/0180793 | A1 | 6/2017 | Cremer et al. |
| 2017/0358127 | A1 | 12/2017 | Lindahl et al. |
| 2018/0103199 | A1 | 4/2018 | Hendry et al. |
| 2018/0242028 | A1 | 8/2018 | Van Brandenburg |
| 2018/0262714 | A1 | 9/2018 | Kim |
| 2019/0082118 | A1 | 3/2019 | Wang |
| 2021/0266613 | A1 | 8/2021 | da Silva Pratas Gabriel et al. |

FOREIGN PATENT DOCUMENTS

| | | |
|---|---|---|
| WO | WO 2017/029400 A1 | 2/2017 |
| WO | WO 2017/103065 A | 6/2017 |
| WO | WO 2017/114821 A1 | 7/2017 |
| WO | WO 2018/150083 A1 | 8/2018 |
| WO | WO 2019/002559 A1 | 1/2019 |

OTHER PUBLICATIONS

Misra, K., et al., "An Overview of Tiles in HEVC" IEEE Journal of Selected Topics in Signal Processing, vol. 7, No. 6, pp. 969-977 (2013).
Greene, et al., "Hierarchical Z-Buffer Visibility," ACM Computer Graphics. 27.10.1145/166117.166147 (1993).
M. S. A. H. Peter Amon, "Compressed Domain Stitching of HEVC Streams for Video Conferencing Applications," International Packet Video Workshop, Munich (2012).
Ochi, Daisuke, et al. "Live streaming system for omnidirectional video", Virtual Reality (VR), IEEE (2015).
Sanchez, Y., et al., "Low Complexity Cloud-video-Mixing Using HEVC," CCNC, No. 11, pp. 213-218 (2014).
Hirose et al., "Integrating Live Video For Immersive Environments", IEEE Multimedia 6.3, pp. 14-22 (1999).
Prins, M. J., et al., "Together Vr: A Framework for Photo-Realistic Shared Media Experiences in 360-Degree VR" International Broadcasting Conference, (2017).
Sanchez, Y., et al. "Compressed Domain Video Processing For Tile Based Panoramic Streaming Using HEVC," ImmersiveME '15: Proceedings of the 3rd International Workshop on Immersive Media Experiences; pp. 13-18 (Oct. 2015).
Mlmaz, Conservative Occulsion Culling for Urban Visualization Using a Slice-wise Data Structure, Jan. 1, 2007, ScienceDirect, Graphical Models, 191-210, 69.

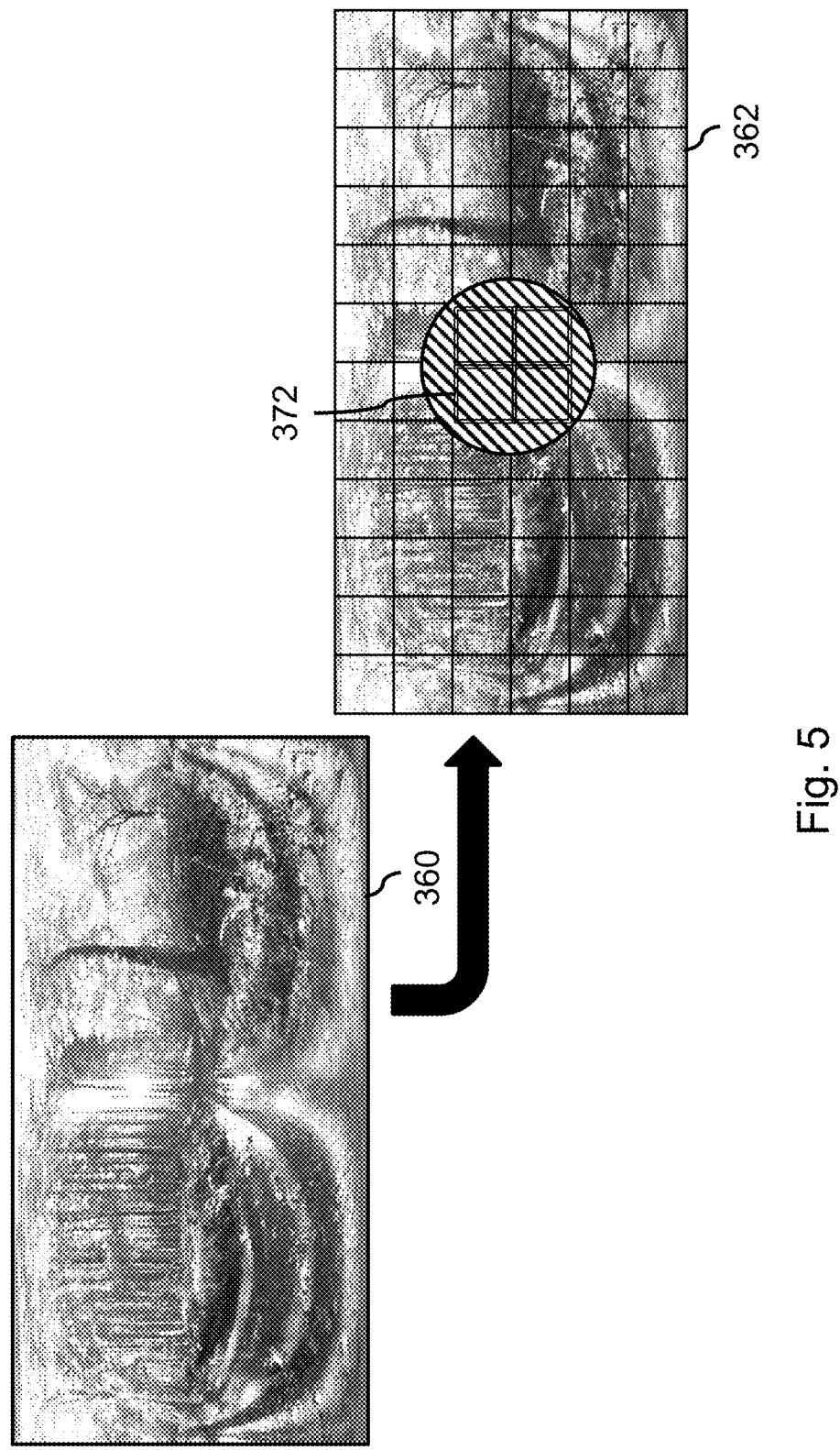

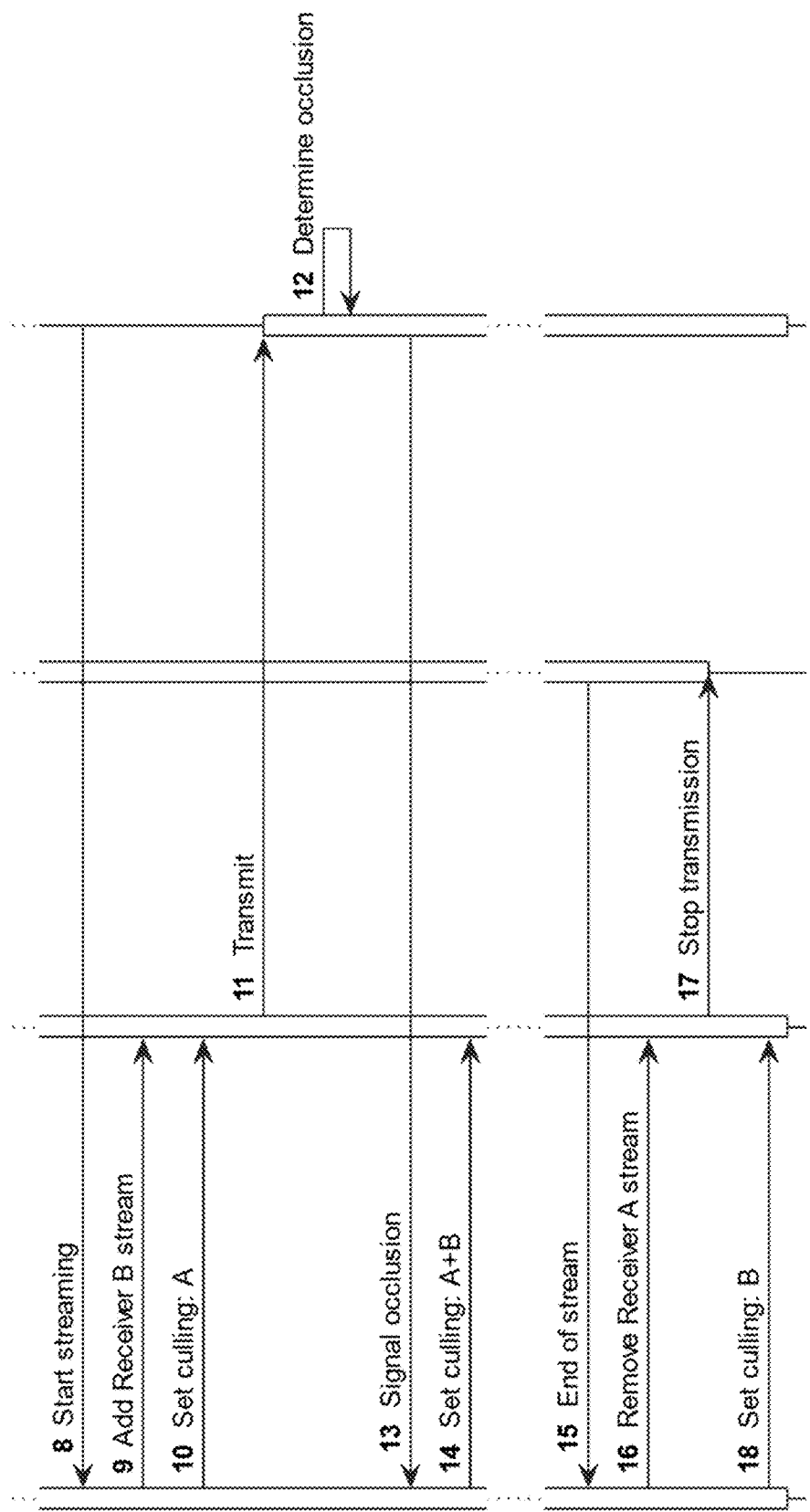

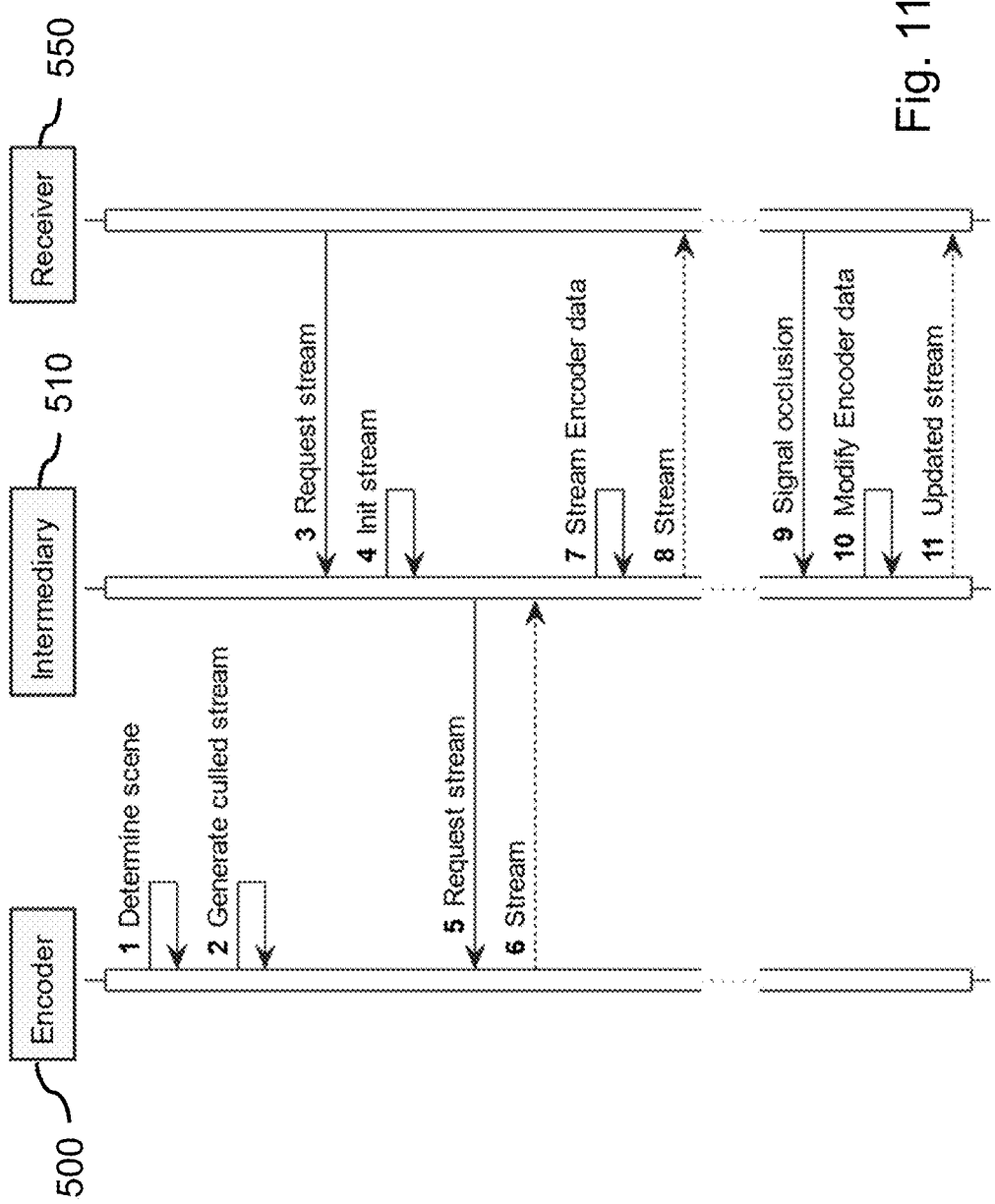

GENERATING AND DISPLAYING A VIDEO STREAM BY OMITTING OR REPLACING AN OCCLUDED PART

RELATED APPLICATION

This application claims priority under 35 U.S.C. § 119 or 365 to European Application No. 18207249.6, filed Nov. 20, 2018, the entire teachings of which are incorporated herein by reference.

TECHNICAL FIELD

The disclosure relates to an encoder system and a computer-implemented method for generating a video stream for a streaming client, for example to be displayed in a 3D computer graphics-based environment such as a Virtual Reality (VR) environment. The disclosure further relates to a computer readable medium comprising signaling data for use in generating said video stream. The disclosure further relates to a receiver system and a computer-implemented method for displaying the video. The disclosure further relates to a computer program for carrying out either method.

BACKGROUND

Media content such as video content and audio content is commonly delivered to users in digital form. If media content has a temporal aspect, and in particular is associated with a timeline which indicates how the media content is to be played-out over time, such digital form is typically referred to as a media stream.

It is known to optimize the streaming of a video. For example, lossy and lossless compression techniques may be used to efficiently encode the video as a video stream. The streaming itself may take place using techniques such as HTTP Adaptive Streaming, or in a specific example MPEG-DASH, which additionally allow the video stream's bitrate to be adapted to the network circumstances. Other streaming techniques include, but are not limited to, WebRTC, and for non-web environments, RTP (also used by WebRTC), HLS, and many proprietary protocols.

It is also known to optimize the rendering of a video stream, namely in cases when a part of the video stream is occluded or masked during display by another object, and as a result, the occluded part would be less or not visible to a user.

A specific example in which a part of a video stream may be occluded is when a video stream is displayed in a 3D computer graphics-based environment. In such 3D environments, individual objects may be modelled as a collection of geometric data points, e.g., as a list of vertices, and optionally by accompanying textures. A video stream may be displayed in the 3D environment by using the image data of the video stream as a texture of an object. This technique is also known as 'billboarding' if the video stream is used as a texture of a substantially flat object. When rendering the 3D environment, for example using a rendering or image synthesis technique, it may occur that a part of the video stream is occluded by another object, i.e., a foreground object. Consider for example the scenario in which an omnidirectional video of a tropical island is used as a 'virtual backdrop' for a multiuser communication session in VR, namely by using the image data of the omnidirectional video as a texture of a sphere's interior and by placing avatars representing the users of the multiuser communication session inside the sphere. From the perspective of a user, the avatars of the other users may occlude parts of the tropical island provided as backdrop, resulting in parts of the video being less or not visible to a particular user.

Such rendering of 3D computer graphics-based environments may be optimized by omitting to render occluded parts of objects. Determining which parts of an object are occluded is known as the hidden-surface problem. A more specific version of this problem is determining which parts of objects are visible to a virtual camera. Many techniques and algorithm are known to address these problems, for example so-termed view frustum culling, backface culling and Z-buffering.

Although the above describes the occlusion of video for a 3D computer graphics-based environment, such occlusion may occur in other scenarios in which a foreground object is displayed over a video, such as in a windowed display setting in which another window partially overlaps the window displaying the video.

Disadvantageously, current techniques for encoding and streaming of a video encode and stream all parts of the video including those which are occluded.

SUMMARY

It would be advantageous to enable obtaining a better compressible version of a video to be streamed to a streaming client. For that purpose, the following measures consider that one or more parts of the video may be occluded during display.

In accordance with a first aspect of the disclosure, an encoder system may be provided for generating a video stream for a streaming client.

The encoder system may comprise:
a communication interface to the streaming client;
an input interface for accessing the video which is to be streamed to the streaming client; and
a processor, which may be configured to:
determine a part of the video which is or would be occluded during display of the video by the streaming client;
generate a video stream by, before or as part of encoding of the video, omitting the part of the video, or replacing video data in the part by replacement video data having a lower entropy than said video data; and
via the communication interface, provide the video stream to the streaming client.

In accordance with a further aspect of the disclosure, a computer-implemented method may be provided for generating a video stream for a streaming client. The method may comprise:
accessing the video which is to be streamed to the client device;
determining a part of the video which is or would be occluded during display of the video by the client device;
generating a video stream by, before or as part of encoding of the video, omitting the part of the video, or replacing video data in the part by replacement video data having a lower entropy than said video data; and
providing the video stream to the streaming client.

In accordance with a further aspect of the disclosure, a transitory or non-transitory computer-readable medium may be provided, which medium may comprise signaling data. The signaling data may be indicative of a part of a video which is or would be occluded during display of the video by a streaming client.

In accordance with a further aspect of the disclosure, a receiver system may be provided representing a streaming client for displaying a streamed video.

The processor system may comprise:
a communication interface;
a processor, which may be configured to:
determine a part of the video which is or would be occluded during display of the video;
and may via the communication interface:
provide signaling data to an encoder system which is indicative of the part of the video to be occluded during display of the video; and
receive a video stream from the encoder system in which the part of the video has been omitted, or video data of the part has been replaced by replacement video data having a lower entropy than said video data.

The receiver system may further render the video stream, typically by combining the video stream with other image or video data that is displayed over the omitted part of the video stream or over the replaced part of the video stream.

In accordance with a further aspect of the disclosure, a computer-implemented method may be provided for displaying a streamed video.

The method may comprise:
determining a part of the video which is or would be occluded during display of the video;
providing signaling data to an encoder system which is indicative of the part of the video to be occluded during display of the video; and
receiving a video stream from the encoder system in which the part of the video has been omitted, or video data of the part has been replaced by replacement video data having a lower entropy than said video data.

The above measures may involve generating a video stream to be streamed, or in another manner provided, to a streaming client. The video stream may be obtained by encoding the video. However, instead of directly encoding the video, the above measures may involve determining a part of the video which is or would be occluded during display of the video by the streaming client, and generating a video stream by omitting the part of the video, or replacing video data in the part by replacement video data having a lower entropy than the video data. In this respect, it is noted that 'generating a video stream' may also comprise modifying an existing video stream, since by said modification, a modified video stream is generated.

Said omitting or replacing may be performed before the encoding of the video, or as part of encoding the video. Both the omitting and the replacing may provide a better compressible version of the video, since by omitting part of the video, the video contains less video data and is thereby better compressible. Furthermore, by replacing part of the video with replacement video data having a lower entropy than the video data which is replaced, the entropy rate of the video is reduced, which is known from the field of information theory to provide a better compression.

Effectively, the video stream may be generated to purposefully omit or replace the video data which is not or only partially visible to a user to achieve better compression. Here, the term 'better compression' may refer to a higher compression ratio at a same/similar quality level, but may also include a same/similar compression ratio at a higher quality level. The resulting video stream may therefore, when streamed, require less bandwidth, or when stored, less storage capacity than without said omitting or replacing of the occluded video data. In addition, in some cases, the encoding and/or decoding of the video may be less computationally complex, resulting in reduced power consumption, increased battery life, etc.

Such omitting of video data may also be referred to as a 'culling' of the video, analogous to view frustum culling and backface culling in 3D computer graphics.

In some embodiments, the streaming client itself may determine which part of the video is or would be occluded during display of the video, and may provide signaling data to the encoder system which may be indicative of said part of the video.

In some embodiments, the processor of the encoder system may, via the communication interface, obtain the signaling data from the streaming client and may determine the part of the video based on the signaling data. In other embodiments, the processor of the encoder system may determine the part of the video without relying on such signaling data. For example, the encoder may obtain other types of information which characterizes the display of the video by the streaming client and from which the part of the video which is or would be occluded during display may be determined.

In the above and following, the term 'is occluded' may refer to a part of the video being actually occluded, for example initially before the above measures were brought into effect or afterwards when the video data in said part is replaced by the replacement video data. The term 'would be occluded' may refer to the part of the video not being occluded during display for the very reason that the above measures were brought into effect. In other words, without the above measures, the part would be occluded. This may occur when the part is omitted from the video stream and thereby never occluded. The term 'occluded' may include the part being entirely but also partially occluded. The latter may refer to the visibility of the video data of the part being reduced, for example due to occlusion by a semi-transparent foreground object. In general, occlusion of a part may also be referred to as a 'masking' of the part.

The term 'video' may refer to any type of spatial-temporal data which represents moving visual images, and may include time-series of 2D images, stereoscopic or volumetric 3D images, but also point clouds, light fields, etc.

The term 'part of a video' may refer a spatial part of the video, including but not limited to a 2D area, a 3D sub-volume, or in case of light fields, a 4D sub-volume. In general, the part of the video may be any subset A of the original video B as defined in the original video's content space, e.g., as described by the following formula: $A \subseteq B$ where $A \subseteq \mathbb{R}^n$, $B \subseteq \mathbb{R}^m$, $n \leq m$, for example, a 5D, 4D or 3D sub-volume in the case of light fields, a 3D or 2D sub-volume in the case of 3D meshes and/or point clouds, and 2D areas in the case of video. In the case of light fields and 3D ray-tracing environments, occluded sets of light rays may be excluded as an alternative.

The term 'streaming client' may refer to a system which may receive and display the video stream. This system may also be referred to as 'receiver system'. In some embodiments, the streaming client may be a client device or a virtual client executed by a processor system. The term 'display' may include the streaming client generating output data for a display which represents a play-out of the video.

The terms 'provide to', 'receive from' and similar terms may include such providing/receiving taking place via intermediary systems and devices, for example via network forwarding nodes, network caches such as HTTP caches, etc.

The terms 'encoder system' and 'receiver system' may refer to different systems, e.g., to an encoding network node and a client device connected via a network, but may also include respective subsystems of a single system or device. Accordingly, the communication interface may be an external communication interface such as a network interface, but may also be an internal communication interface. In a multi-user communication setting, the encoder system may be implemented by another receiver system of another user in a multi-user communication session.

In an embodiment, the signaling data may be received by the encoder system from another processor system which at least in part determines the display of the video by the streaming client. In some scenarios, such as multiuser communication or gaming or in general client-server-based scenarios, another processor system may be aware of how the video is displayed by the streaming client, and more specifically, whether and if so which part of the video is or would be occluded during display. For example, if the streaming client represents a participant in a multiuser communication session, said processor system may represent a server orchestrating the multiuser communication session. By obtaining the signaling data from such a processor system, it may not be needed to obtain the signaling data from the streaming client itself.

In an embodiment, the processor of the encoder system may be configured to initially generate the video stream to include all of the video, and to omit or replace the part of the video in response to obtaining the signaling data. At a start of streaming, it may not be yet known which part of the video is occluded during play-out. Accordingly, the encoder system may start omitting or replacing the part of the video once the signaling data is received from the streaming client. This way, it may be avoided that the video stream inadvertently omits video data which is not occluded.

In an embodiment, the video stream may be provided to each of a plurality of streaming clients, wherein different parts of the video are or would be occluded when the video is displayed by different ones of the plurality of streaming clients, and the processor of the encoder system may be configured to process the video to omit, or to replace the video data of, a mutually overlapping part of the different parts. If the video is to be provided to a plurality of streaming clients and if different parts of the video are or would be occluded when the video is displayed by different ones of the plurality of streaming clients, the encoder system may generate a different video stream for each of the streaming clients. However, a more computationally efficient option may be to generate a video stream for all or a subset of the streaming clients in which a mutually overlapping part of the different parts is omitted or replaced, e.g., a part which is or would be occluded at each streaming client. For example, an intersection of the different parts may be omitted or replaced. A specific example of a part which is occluded at each streaming client is a table serving as setting for a 'virtual conference'. Each participant may be represented by a 'video avatar' at the table, e.g., a video stream of his/her camera recording. The table may then occlude the legs of each participant in the respective camera stream. The obtained video may be better compressible yet may provide all non-occluded video data to each streaming client.

In an embodiment, the processor of the encoder system may be configured to generate the video stream as a segmented encoding of the video comprising independently decodable segments, and to omit to encode, and/or omit to stream, and/or omit to include in a manifest file, segments which represent the part of the video to be omitted. Such a segmented encoding may be a spatially segmented encoding, providing independently decodable spatial segments. Such an encoding may enable the processor to omit the occluded part of the video in various ways, for example by omitting to encode segments which represent said part, by declining to stream such segments, or by not listing such segments in a manifest file associated with the video stream and thereby disabling streaming clients from requesting such segments.

In an embodiment, the processor of the encoder system may be configured to omit the part of the video by cropping the video, or to reformat the video to obtain a representation of the video which omits the part, or which allows the part to be omitted by cropping of the video. It may not be always possible to omit the part of the video by cropping the video. For example, the video format may not enable such type of cropping. Another example is that an interior part of a video may be occluded, which interior part may not be directly cropped as the convex hull of the video may remain the same. According, the processor may reformat the video to obtain a representation of the video which omits the part, or which allows the part to be omitted by cropping of the video. For example, such reformatting may include geometric transformations.

In an embodiment, the video stream may be generated to omit or replace further video data which is or would be visible to the user, but which further video data is spatially connected, spatially adjacent or in any other form spatially associated with the video data to be omitted or replaced. For example, if the video stream is to be generated as a spatially segmented video stream, and one segment is partially occluded, the entire segment may be omitted from the generated video stream.

In an embodiment, the encoder system may be an edge node in a 5G or next-gen telecommunication network. By providing the encoder system as an edge node, the latency to the streaming client may be reduced, which may improve responsiveness of the encoder system, e.g., in case of changes in the occluded part.

In an embodiment, the processor of the receiver system may be configured to periodically determine which part of the video is or would be occluded during display, and to periodically provide the signaling data to the encoder system. The part which is or would be occluded during display may change over time, e.g., due to movement of graphics objects in a 3D computer graphics-based environment. Accordingly, the receiver system may periodically provide the signaling to the encoder system, for example at fixed time intervals or in response to a change in the occluded part. Thereby, it may be avoided that parts of the video data are omitted or replaced which in the meantime have become de-occluded and thereby have become visible.

In an embodiment, the part of the video may or would be occluded during display by another object, such as another video or a computer-graphics based object.

In an embodiment, the signaling data may define the part as a region or a sub-volume of the video, for example by defining a list of points or an equation, the list of points or the equation defining a polygon or a mesh. The equation may for example be a parameterized equation or a non-parameterized equation. In the above-mentioned case of a spatially segmented video stream, the signaling data may indicate at least one spatial segment of which the video data is/would be occluded during display.

In an embodiment, the signaling data may identify a video stream to which the signaling data pertains. This may be advantageous in scenario's where clients are transmitting multiple streams, or for multiclient scenario's where participants (or intermediary systems) may signal occlusion data for streams other than their own.

It will be appreciated by those skilled in the art that two or more of the above-mentioned embodiments, implementations, and/or aspects of the invention may be combined in any way deemed useful.

Modifications and variations of the method(s), the processor system(s), the signaling data and/or the computer program(s), which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 3A-3B illustrate the occlusion of a video in the context of a 3D computer graphics-based environment, in which the video is used as a texture of an interior of a sphere, and in which a foreground object occludes part of the interior of the sphere from a perspective of an observer in the 3D environment, in which:

FIG. 3A shows a side-view of the 3D environment,
and
FIG. 3B shows a top-down view of the 3D environment.

FIG. 5 shows a tiled version of the video of FIG. 3A-4, in which the tiles are indicated which are entirely occluded by the foreground object;

FIGS. 10A and 10B show a message exchange between a multipoint control unit and two receiver systems acting as streaming clients;

FIG. 11 shows a message exchange between an encoder system, an intermediary system and a receiver system acting as streaming client;

Figure 1A:
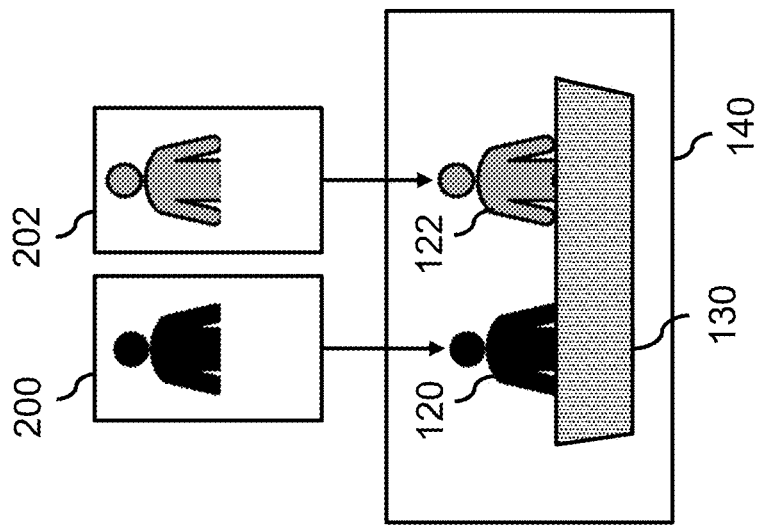
FIG. 1A shows videos being inserted into a scene, with each video being partially occluded by a foreground object in a rendered version of the scene.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100,102 video stream
120, 122 video inserted into scene
130 foreground object (table)
140 rendered scene
200,202 video stream omitting/replacing occluded part
204 cropped video stream
210 occluded part
220 replacement video content
230 omitted part
300 3D computer graphics-based environment
310 observer (virtual camera)
320 sphere having video as texture of interior
330 foreground object
340 lines of sight at border of foreground object
350 occluded part of sphere's interior
360 omnidirectional video for use as texture of sphere's interior
362 tiled version of omnidirectional video
370 occluded part of omnidirectional video
372 tiles containing occluded part of omnidirectional video
400-404 tiled version of video containing person
410 composition based on non-occluded tiles
500 encoding system
505 multipoint control unit
510 intermediary system
520 video stream
530 signaling data
540 network
550, 552 receiver system
560 head mounted display
565 rendered image data
600 (encoder) processor system
610 communication (network) interface
612 communication (network) data
620 input interface
625 data storage
630 processor
700 (receiver) processor system
710 communication (network) interface
712 communication (network) data
720 processor 730 display output
732 display data
735 display
800 method for generating video stream for streaming client
810 accessing video to be streamed
820 determining occluded part of video
830 generating video stream
840 providing video stream to streaming client
850 method for displaying streamed video
860 determining occluded part of video
870 providing signaling to encoder system
880 receiving video stream
900 computer readable medium
910 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION

The following embodiments relate to the generating of a video stream in which part of the video has been omitted or replaced on the basis of that the part is or would be occluded during display of the video by the streaming client. The part may be identified based on, for example, signaling data received from the streaming client.

Some of the following embodiments are described in the context of video-based multi-user communication, for example in a 'Social VR' context where a number of users may participate in a teleconference using Head Mounted Displays (HMDs) and cameras. However, the techniques described in this specification may also be applied in all other applications in which part of a video is occluded by a foreground object. A non-limiting example is a 3D computer graphics-based environment other than a video-based multi-user communication environment, for example for gaming or media consumption, in which the video is displayed and may be partially occluded by a computer graphics-based object. Another example is a windowed display setting, e.g., as established and controlled by window manager of an operating system, in which another window partially overlaps the window displaying the video.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame.

The following embodiments further assume that the video is a 2D video, and that the occluded part of the video is a 2D area. However, the applicability of the techniques described in this specification to other types of video, e.g., stereoscopic or volumetric 3D video, point cloud videos or light field videos, is also discussed and within reach of the skilled person on the basis of the present specification.

FIG. 1A illustrates, by way of example, a use-case in which two video streams 100, 102 are received by a streaming client and inserted into a scene, such as a 3D computer graphics-based environment. Such insertion may, for example, using the video data of each video as a texture for a respective object in the scene (e.g., 'billboarding'), thereby obtaining inserted videos 120, 122. Various other ways of inserting video into a scene are known, and depend on the nature of the scene.

The scene may contain other objects, such as in the example of FIG. 1A a table 130, which may be positioned in front of the videos 120, 122. Here, 'in front' may refer to the object being nearer to an observer, e.g., a virtual camera as also discussed with reference to FIGS. 3A-3B, nearer to a projection plane used in the scene rendering, etc. As such, the object 130 may also be referred to as 'foreground object' 130. Examples of such objects vary depending on the application, but may include computer graphics-based objects as well as image- or video-based objects. As a result of the foreground object 130 being positioned in front of the inserted videos 120, 122, each video 120, 122 may be partially occluded by the foreground object 140 in the rendered scene 140, e.g., as rendered by the streaming device for display to a user.

In a specific example, the video streams 100, 102 may be WebRTC streams of participants to a stand-up meeting which may be transmitted from respective streaming clients of said participants to a streaming client of the user, who may also be a participant to the stand-up meeting or only an observer. The received streams 100, 102 may be positioned as side-by-side planes 120, 122 in a 3D environment, which may show a meeting room. A virtual camera may determine how the scene is to be rendered to the observer. Between the virtual camera and the video planes 120, 122, a virtual table 130 may be placed such that it appears to be on the floor of the 3D environment, thereby occluding the legs of the participants shown in the video planes 120, 122. Such occlusion may be deliberate to increase immersion and give the impression to the users that they are in fact in the meeting room. The scenario described in this paragraph is a common scenario in Social VR applications.

Figure 1B:
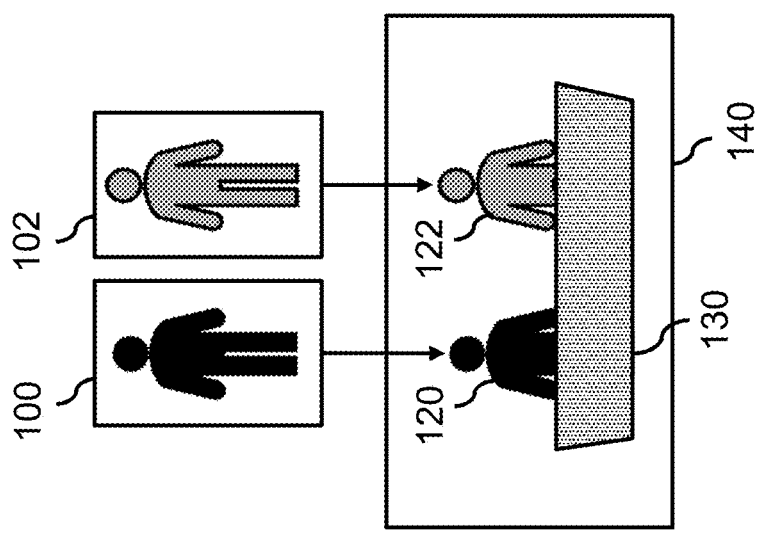
FIG. 1B illustrates a 'culling' of the video stream of each respective video, by which the occluded part of each video is omitted or replaced before streaming.

FIG. 1B illustrates a 'culling' of the video stream of each respective video, by which the occluded part of each video is omitted, or by which video data in the occluded part is replaced by replacement video data, before streaming. Such culling is further explained with reference to FIGS. 2A-2C, and the mechanisms enabling the culling with reference to FIGS. 7-14 and others. Briefly speaking, it may be determined that the bottom part of each video stream 100, 102 is not visible to the observer in the 3D environment, which may be determined by for example the streaming client receiving the video streams 100, 102. In this latter example, the streaming client may generate signaling data for the sender of each respective video stream 102, 102 which is indicative of the occluded part, for example by defining a bounding box representing the occluded area. If a sender has the functionality of the encoder system as described throughout this specification, the sender may cull the video in response to the signaling data and generate a video stream 200, 202 from the culled video, as illustrated in FIG. 1B by the video streams 200, 202 omitting the legs of the participants. It will be appreciated that the rendered scene 140 may look identical or at least similar to the one of FIG. 1A as the non-transmitted video data would otherwise be occluded in the rendered scene. In other words, the non-transmitted video data would not be visible anyway in the scene, or in case of partial occlusion, only be partially visible.

Figure 2C:
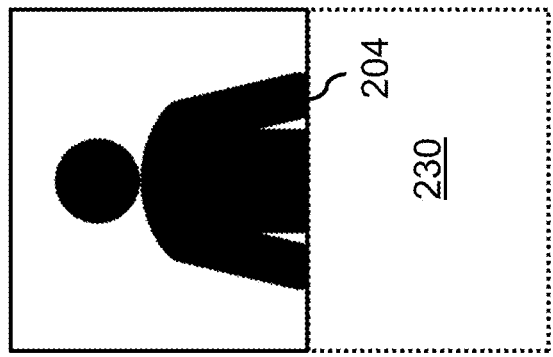
FIG. 2C illustrates a cropping of the occluded part of the video.
Figure 2B:
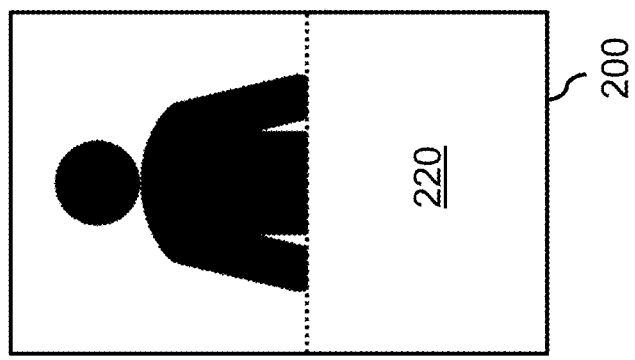
FIG. 2B illustrates a replacement of the video data in the occluded part by uniform background video data having a lower entropy than the replaced video data.
Figure 2A:
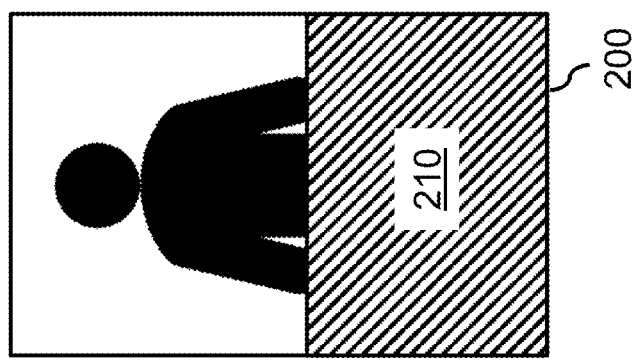
FIG. 2A shows the occluded part of one of the videos of FIG. 1A.

FIG. 2A shows an area 210 representing the occluded part of one of the videos 200 of FIG. 1A. This particular example shows the occluded part having a relatively simply shape, namely a rectangular shape. As will also be elucidated elsewhere, e.g., with reference to FIGS. 3A-5A, the occluded part may also have any other shape depending on the foreground object(s), the geometric relation between the foreground object(s) and the video in the scene, the type of rendering, etc. The area 210 and other types of occluded parts may be culled from the video in various ways.

For example, FIG. 2B illustrates a replacement of the video data in the occluded part by uniform background video data 220 having a lower entropy than the replaced video data. For example, such replacement video data may be uniform (homogeneous), e.g., of a certain uniform color such as white or black, or may contain an easily compressible pattern, or may be made fully transparent. In the latter case, the replacement video data may be considered simply as another uniform color.

FIG. 2C illustrates a cropping of the occluded part of the video. Effectively, the occluded part is culled from the video by removing the part 230 from the video, typically resulting in a video 204 with smaller spatial dimensions and often a different aspect ratio. It will be appreciated that such cropping may be advantageous in case the occluded part of the video is located nearby an edge or corner of the video frame, or if the occluded part is in any other way contained in the video data such that it can be easily cropped from the video data. If this is not the case, e.g., as also exemplified in FIGS. 3A-5, the video data may also be reformatted, e.g., by a spatial transformation, to obtain a representation of the video data which directly omits the occluded part, or from which the occluded part may be cropped. For example, if the occluded part is in the middle of the video, the video data may be moved ('panned') within the video frame to move the occluded part towards an edge or corner of the video frame. It is noted that such reformatting of the video data may further involve signaling the streaming client that the video stream contains reformatted video data, and optionally, which type of reformatting has been applied to the video data.

Figure 3B:
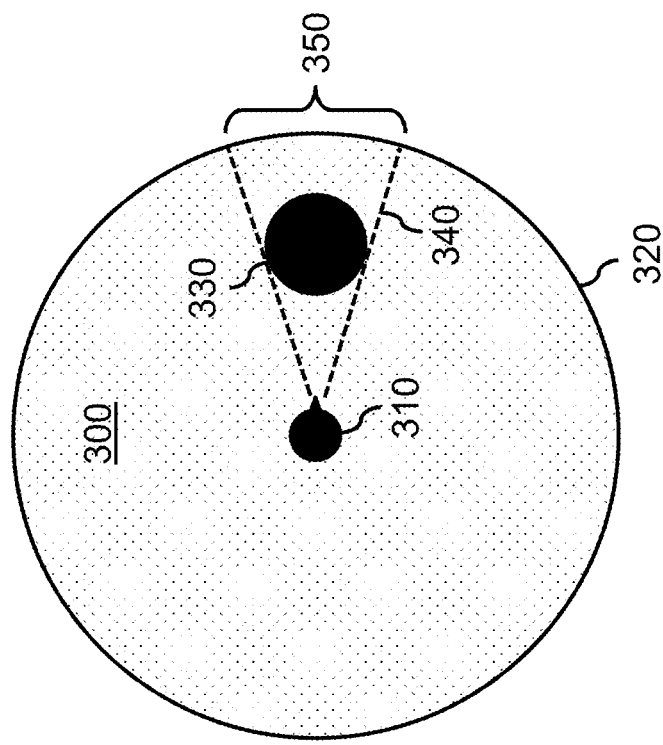
Figure 3A:
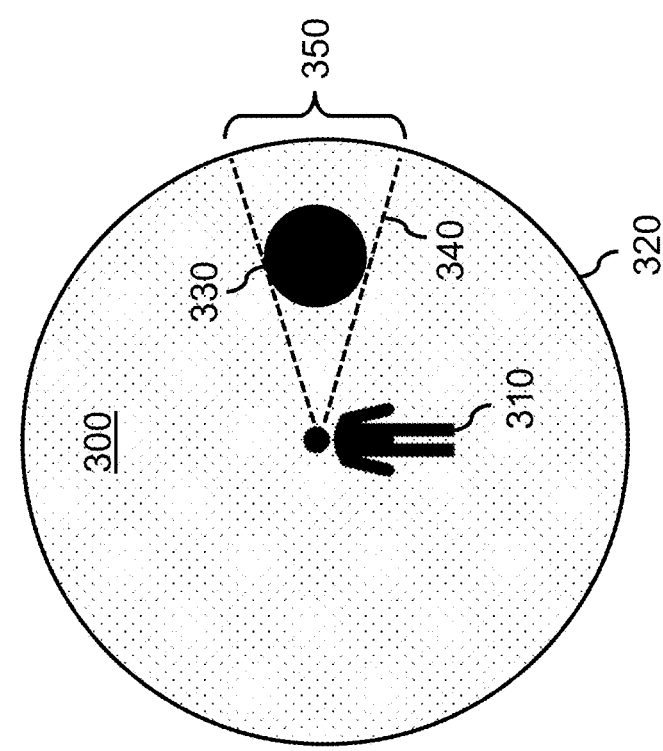

FIGS. 3A-3B illustrate the occlusion of a video in the context of a 3D computer graphics-based environment 300, with FIG. 3A showing a side-view of the 3D environment 300 and FIG. 3B showing a top-down view of the 3D environment 300.

In such 3D environments, a video may be used as a 'virtual backdrop' of the 3D environment 300 by displaying the video onto an interior of a (typically virtual) sphere 320 which surrounds other objects of the 3D environment 300. Such projection may for example involve the video being used as a texture for the sphere's 320 interior. As is known per se, a user may be represented as an observer in the 3D environment by a virtual camera 310. In the examples of FIGS. 3A-3B, the virtual camera 310 is represented by a graphical representation of the user, which may also, but does not need to, represent a user's graphical representation ('avatar') in the 3D environment 300. The 3D environment 300 may contain various objects, such as furniture objects and avatars of other users in case of an indoor scene, or buildings, vehicles, etc. in case of an outdoor scene. A user may have a particular field of view in the 3D environment (not explicitly shown in FIGS. 3A-3B), which is also known as the view fustrum of the virtual camera 310. In this field of view, a foreground object may be visible, being in the example of FIGS. 3A-3B a spherical object 330. The foreground object 330 may occlude a part 350 of the sphere's 320 interior, and thereby a corresponding part of the video which is projected onto the sphere's 320 interior. This is indicated in FIGS. 3A-3B by lines tracing along the edges of the foreground object 330, thereby indicating the edges of the occluded part 350 on the sphere's 320 interior. Essentially, due to the foreground object 330, a part of the background provided by the video may not be visible.

Figure 4:
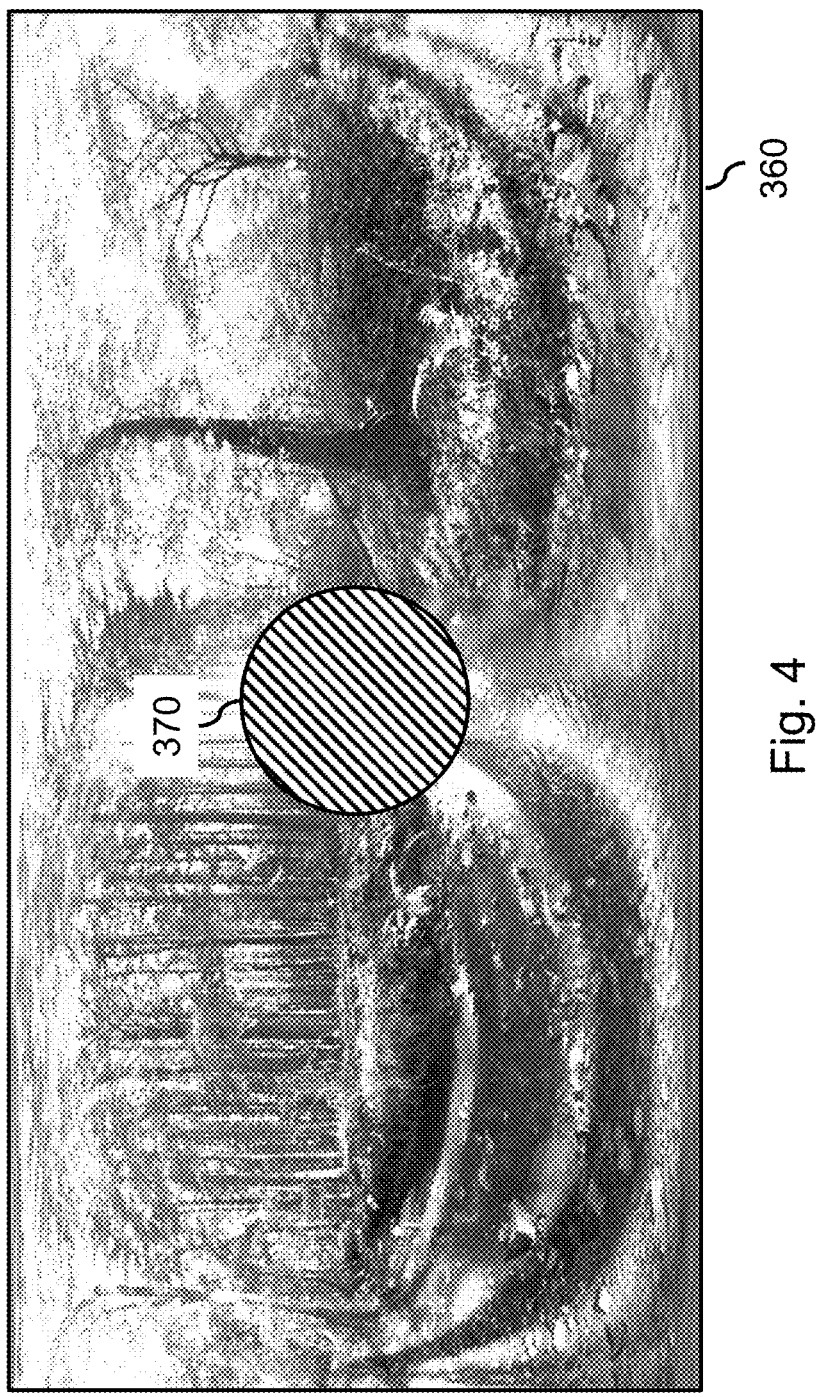
FIG. 4 shows an example of a video used as a texture of the interior of the sphere of FIGS. 3A-3B, while indicating the part of the video which is occluded by the foreground object from the perspective of the observer in the 3D environment.

FIG. 4 shows an example of a video 360 used as a texture of the interior of the sphere of FIGS. 3A-3B, while indicating the part 370 of the video which is occluded by the foreground object from the perspective of the observer in the 3D environment. In this example, the video 360 represents an equirectangular projection of an omnidirectional video, e.g., a 360-degree video, in a rectangular video frame. It will be appreciated, however, that the video 360 may also be of any other type, e.g., a panoramic video, such as a 180-degree video, a 'conventional' 2D video, etc.

The occluded part 370 may be determined based on data characterizing the 3D environment, e.g., the relative positions of the virtual camera, the foreground object and the inserted video. Within 3D environments, such occlusion detection is well known, as described elsewhere in this specification. Another option is that raytracing techniques may be used, in which it is detected which parts of objects are not hit by viewing rays and therefore are determined to be occluded. In general, various types of data characterizing the relationship between the video and the foreground object may be used to determine which part of the video is occluded. It is noted that such data may be present at the streaming client, but in some embodiments also at another entity, such as an encoder system culling the video. For example, the encoder system may be aware of the relation between the video and the foreground object as it may, at least in part, determine this relation, for example in a client-server context. Another example is that the encoder system may obtain this data as signaling data from the streaming client or another entity. These aspects are also further discussed with reference to FIGS. 8-12.

FIG. 5 shows the video 360 and a spatially segmented representation 362 of the video which may be obtained by encoding the video 360 in a spatially segmented manner. For example, as spatial segments, so-called 'tiles' may be used which may subdivide a video frame into logically separate rectangular parts that may be decoded independently when decoding a given frame. For example, HEVC tiles, as described in "An Overview of Tiles in HEVC" by K. Misra et al., IEEE Journal of Selected Topics in Signal Processing, vol. 7, no. 6, pp. 969-977, 2013, as well as similar spatially segmented encodings may not allow spatial prediction across tile boundaries in a frame or may not allow entropy coding dependencies across file boundaries. As such, the tiles may be independent with respect to the encoding and decoding process; prediction and filtering do not cross tile boundaries. The HEVC standard defines the tile configuration for the entire frame as a homogenous regular grid, as also depicted by FIG. 5. It will be appreciated that next to HEVC tiles, other types of spatially segmented encoding techniques exist as well.

In general, such spatial segments may be used to exclude the occluded part of the video on a segment-by-segment basis. For example, the encoder system may choose to omit encoding and/or streaming the spatial segments 372 of which the video data is fully occluded by the foreground object. Additionally, or alternatively, the encoder system may omit such spatial segments from a manifest file associated with the spatially segmented video 362. In some embodiments, the spatial segments' granularity may be optimized to allow the occluded part to be well-covered by a subset of the spatial segments, e.g., fine enough to allow the subset of spatial segments to match the general shape of the occluded part, but not too fine as otherwise the compression ratio may reduce, e.g., due to encoding overhead. In some embodiments, the occluded part may cover a part of a spatial segment, and the occluded part may be culled from the spatial segment, e.g., as described with reference to FIG. 2B.

Figure 6B:
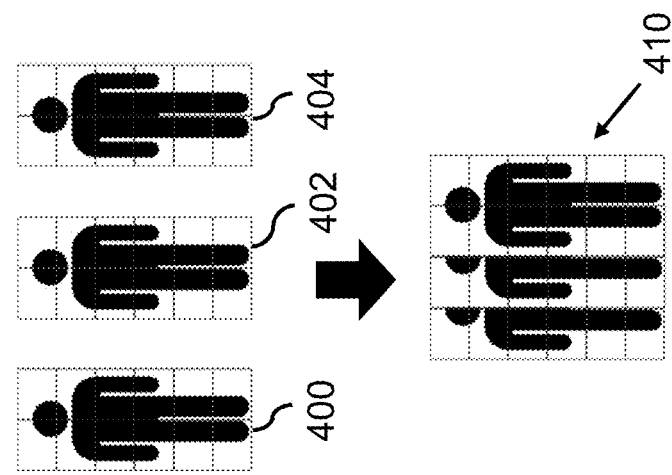
FIG. 6A-6B illustrate how a composition of different tiled video streams may be generated by streaming only the non-occluded tiles of the tiled video streams.
Figure 6A:
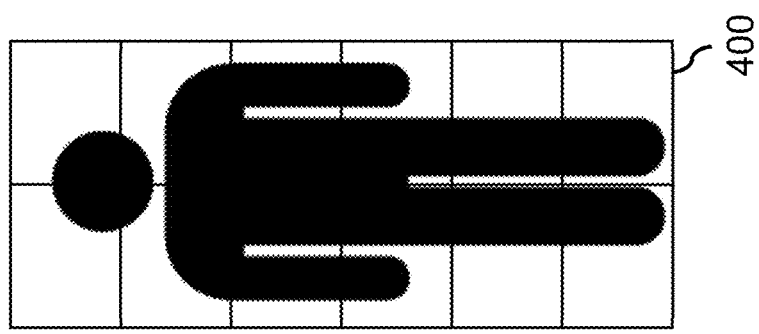

FIG. 6A-6B illustrate how a composition of different tiled video streams 400-404 may be generated by streaming only the non-occluded tiles of the tiled video streams. Namely, with standards such as MPEG-DASH tiling, it may be possible to select only the foremost tiles of each of the video streams for streaming. If it is known that tiled video streams may partially occlude each other, only the 'foreground' tiles may be requested for streaming by the streaming client, or from the perspective of the encoder system, encoded and/or streamed. For example, in FIG. 6, multiple students may participate in a virtual lecture by video conferencing, with each student's video being encoded in a tile-based manner, obtaining tiled video streams 400-404. As shown in FIG. 6B, if the video streams are displayed to partially occlude each other, then only the visible tiles may be requested, e.g., reducing from 3×12=36 tiles being encoded and/or streamed to 6+6+6=18 tiles being encoded and/or streamed.

In general, the streaming client may primarily request those tiles, or in general those spatial segments, which are not occluded in the rendered scene. The streaming client may signal such occlusion to the encoder system. Thereby, the streaming client may primarily encode those tiles which are not occluded in the rendered scene. Here, the term 'primarily' may refer to 'only those', or 'only those' as well as a margin around the non-occluded spatial segments, e.g., a guard-band.

Figure 7:
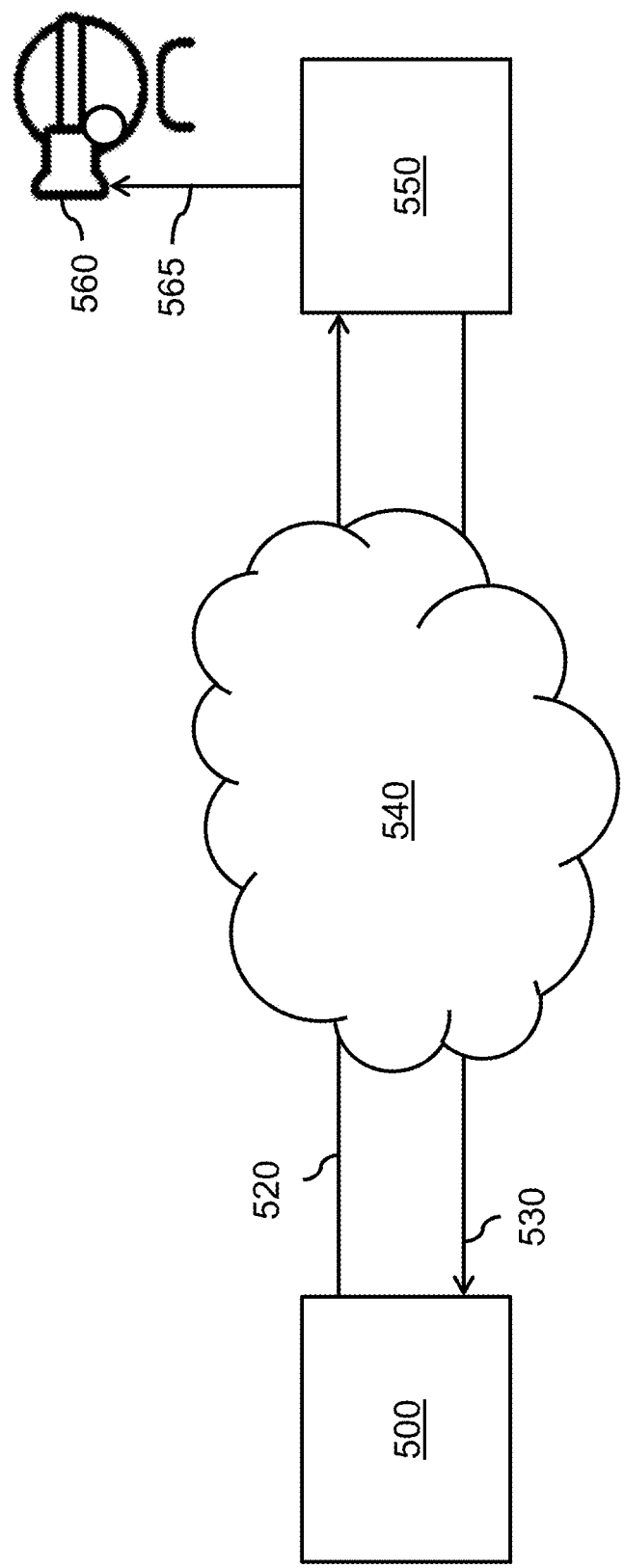
FIG. 7 shows data communication between an encoder system and a receiver system acting as streaming client and configured for displaying a video stream received from the encoder system in a VR environment.

FIG. 7 shows data communication between an encoder system 500 and a receiver system 550 acting as streaming client. The receiver system 550 may be configured for displaying a video stream received from the encoder system, being in this specific example a Virtual Reality (VR) environment. The encoder system 500 may correspond to an encoder system as previously described, as well as to subsequently described encoder systems, e.g., with reference to FIGS. 8-13. The receiver system 550 may correspond to a streaming client as previously described, as well as to subsequently described streaming clients and receiver systems, e.g., with reference to FIGS. 8-12 and 14. The encoder system 600, which may for example be a cloud-based server, may stream a video stream 520 to the receiver system 550. Upon receiving the video stream 520, the receiver system 550 may establish a visual rendering of a VR environment in which the video stream is displayed. The receiver system 550 may then output rendered image data 565 to an HMD 560 worn by a user. Before or during the streaming of the video stream 520, the receiver system 550 may provide signaling data 530 to the encoder system 500 which may indicate which part of the video stream 520 is occluded in the rendered VR environment. In response, the encoder system 500 may cull the occluded part of the video and encode the culled video as a video stream.

Figure 8:
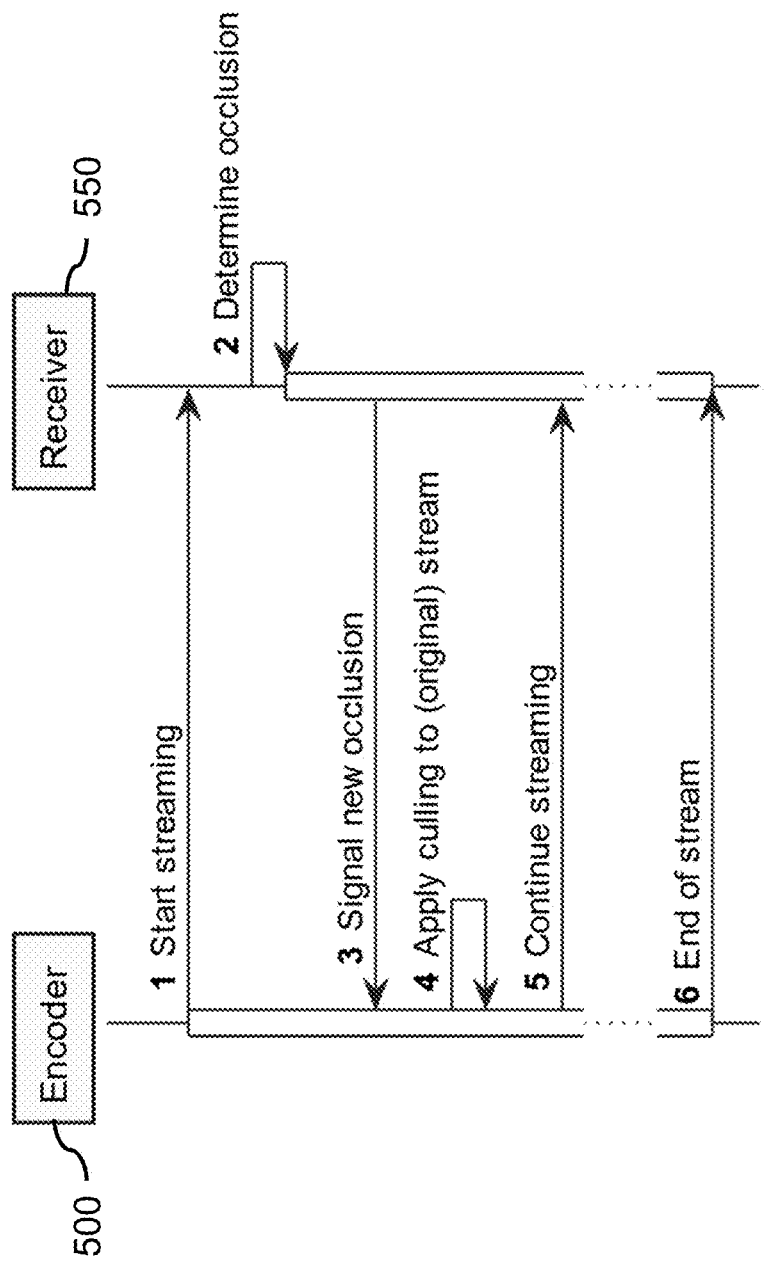
FIG. 8 shows another message exchange between an encoder system and a receiver system acting as streaming client for a static scene.

FIG. 8 shows a message exchange between an encoder system and a receiver system acting as streaming client. The encoder system and receiver system are in FIG. 8 and others simply referred to as 'encoder' and 'receiver', and may, but do not need to, correspond to the encoder system 500 and the receiver system 550 of FIG. 7 and others. In this example, the receiver 550 may render a 3D environment, also generally referred to as 'scene', and both the encoder 500 and the receiver 550 may be aware of the geometry of the scene. The receiver 550 may render the scene from a static position. Objects within the scene may also be static with respect to their position, but not necessarily their appearance. The virtual camera used to render the scene may be rotated, but not moved. Accordingly, as also shown in FIG. 8, the receiver 550 may, after a start of streaming as indicated by an arrow labeled '1. Start streaming', determine the occlusion of the video once, e.g., as indicated by an arrow labeled '2. Determine occlusion', and then signal the determined occluded part(s) to the encoder 500, e.g., as indicated by an arrow labeled '3. Signal new occlusion'. The encoder 500 may respond by adjusting the ongoing video stream, namely by culling the video data in the occluded part as described elsewhere, e.g., as indicated by an arrow labeled '4. Apply culling to (original) stream'. The encoder 500 may then continue streaming the adjusted video stream, e.g., as indicated by an arrow labeled '5. Continue streaming', possibly until an end of the stream is reached, e.g., at an arrow labeled '6. End of stream'.

Figure 9:
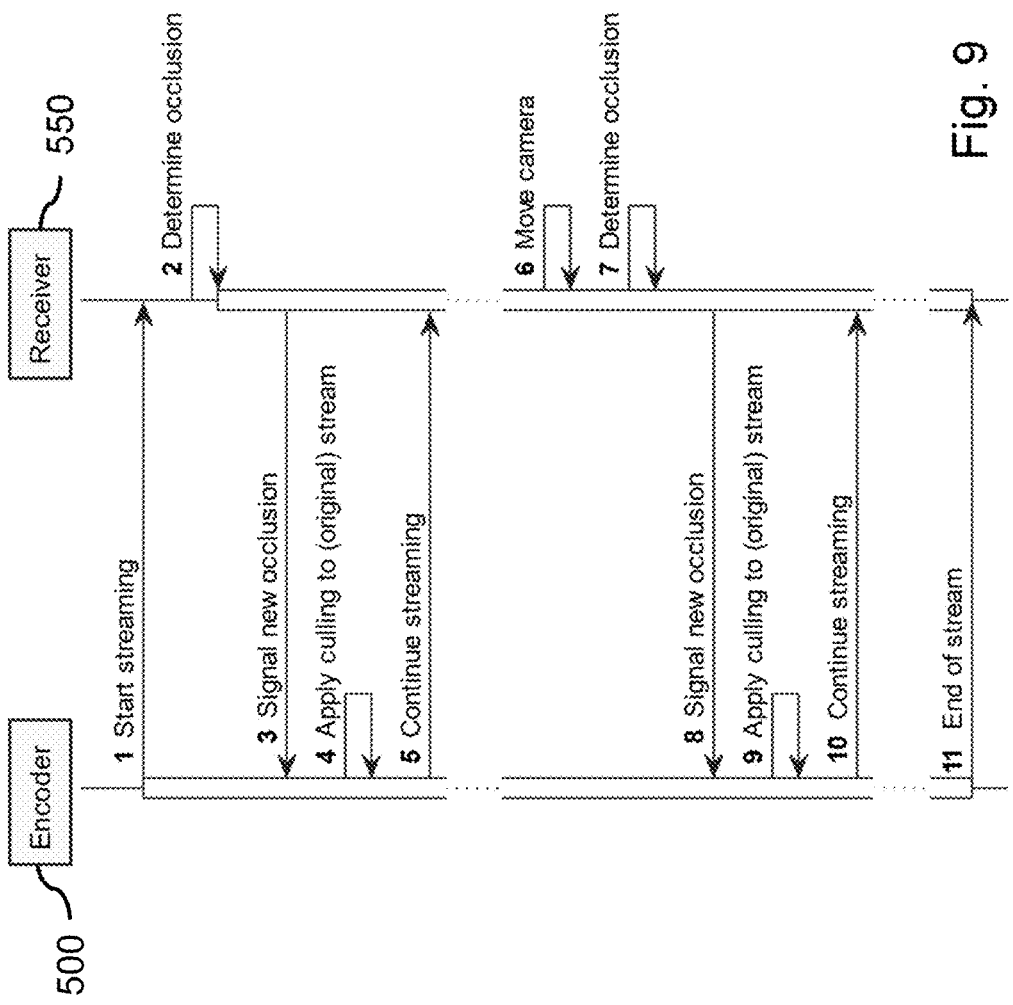
FIG. 9 shows a message exchange between an encoder system and a receiver system acting as streaming client for a dynamic scene.

FIG. 9 is similar to FIG. 8 except that it shows a message exchange between an encoder system 500 and a receiver system 550 acting as streaming client for a dynamic scene, namely a scene in which the occluded part changes over time. For example, if the virtual camera is moved in the scene, e.g., as indicated by an arrow labeled '6. Move camera', the occlusion may change, which may prompt the receiver to (re)determine the occlusion, e.g., as indicated by an arrow labeled '7. Determine occlusion'. Following steps 8-11 reflect steps 3-6 of FIG. 8, mutatis mutandis.

Figure 10A:
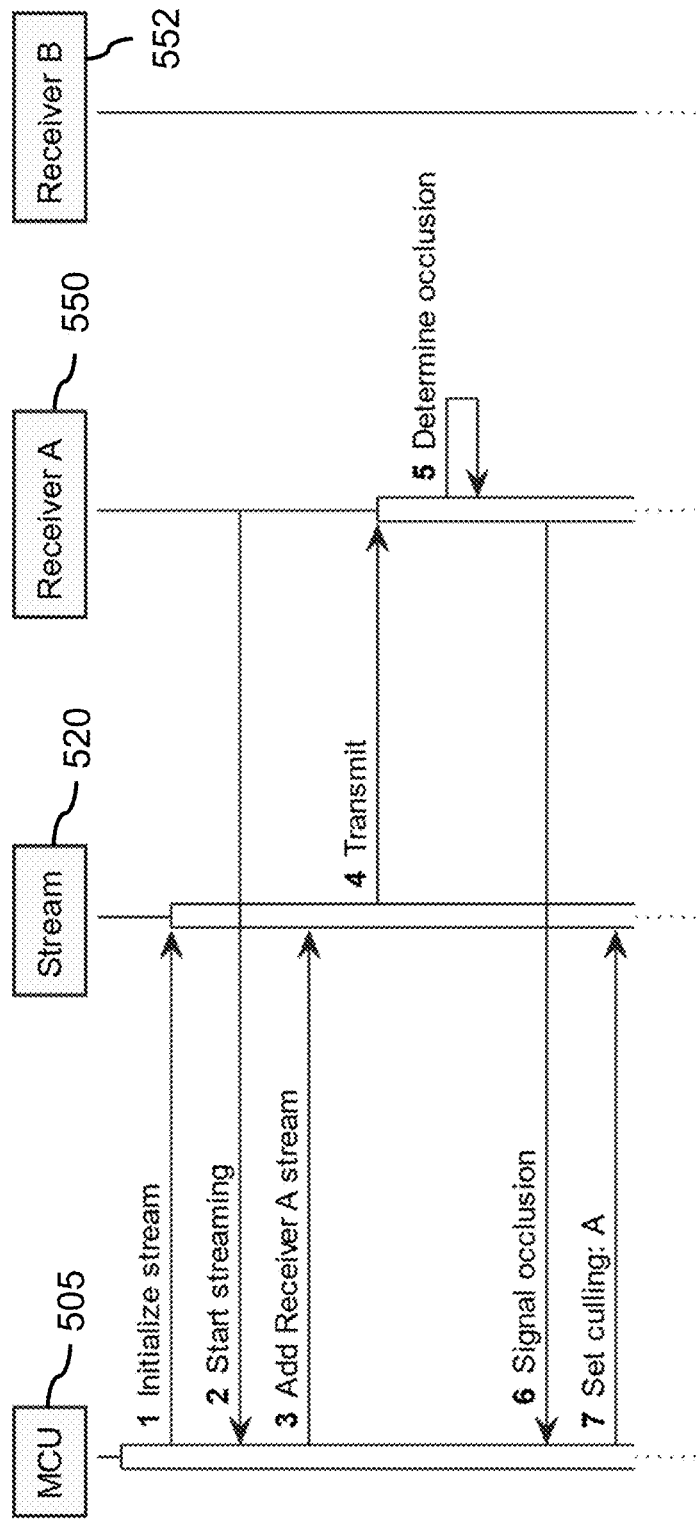

FIGS. 10A-10B show a message exchange between a multipoint control unit 505 (MCU, see https://trueconf.com/blog/wiki/multipoint-control-unit) and two receiver systems 550, 552, labeled 'A' and 'B', acting as streaming clients. Essentially, the MCU 505 may receive video streams from each receiver system 550, 552, e.g., representing a camera recording of respective users, and generate a video stream which includes both videos. Such a video stream may be referred to as a 'combined' or 'composite' video stream. The combined video stream may then be sent to each receiver system 550, 552 for display. It is noted that, for sake of explanation, the generated video stream is shown in FIGS. 10A-10B as a separate entity 520. The MCU 505 may implement the functionality of the encoder system as described elsewhere, in that a part of the combined video may be occluded when the combined video is displayed by the receiver systems 550, 552. In the example of FIGS. 10A-10B, a different part (named 'A' and 'B') of the combined video stream 520 is occluded when displayed by either receiver system 550, 552. The MCU 505 may then generate the combined video stream 520 by culling a mutually overlapping part, such as an intersection, of parts A and B in the combined video. When one of the receivers stops participating, such as receiver system 550 A, the MCU 505 may stop transmitting the generated stream to the particular receiver and may continue to cull only the occluded part of the remaining receiver, e.g., receiver system 552 B, in the generated video stream, or if there are multiple remaining receivers, only a mutually overlapping part of their occluded parts.

The steps involved may be as follows. Firstly, the combined stream 520 may be initialized, e.g., as indicated by an arrow labeled '1. Initialize stream'. Such initialization may comprise allocating resources, e.g. memory, sockets, etc., starting a graphics processing pipeline, etc. Depending on the used streaming protocol, such initialization may also entail exchanging signaling information to establish a streaming session (although this may also be considered part of the next step). The receiver A 550 may then start streaming its stream, e.g., as indicated by an arrow labeled '2. Start streaming'. In response, the MCU 505 may add the video of receiver A 550 to the combined video stream 520, e.g., as indicated by an arrow labeled '3. Add Receiver A stream'. The combined video stream may then be transmitted to receiver A 550, e.g., as indicated by an arrow labeled '4. Transmit'. Receiver A 550 may then determine which part of the combined video stream 520 is occluded during display, e.g., as indicated by an arrow labeled '5. Determine occlusion', and then signal the occluded part, e.g., part A, to the MCU 505, e.g., as indicated by an arrow labeled '6. Signal occlusion'. In response, the MCU 505 may cull part A in the combined video, using a culling technique as described elsewhere in this specification and as indicated by an arrow labeled '7. Set culling: A'. Continuing on FIG. 10B, the receiver B 552 may then start streaming its stream, e.g., as indicated by an arrow labeled '8. Start streaming'. In response, the MCU 505 may add the video of receiver B 552 to the combined video stream 520, e.g., as indicated by an arrow labeled '9. Add Receiver B stream'. The MCU 505 may continue to cull part A in the combined video, e.g., as indicated by an arrow labeled '10. Set culling: A'. The combined video stream may then be transmitted to receiver B 552, e.g., as indicated by an arrow labeled '11. Transmit'. Receiver B 552 may then determine which part of the combined video stream 520 is occluded during display, e.g., as indicated by an arrow labeled '12. Determine occlusion', and then signal the occluded part, e.g., part B, to the MCU 505, e.g., as indicated by an arrow labeled '13. Signal occlusion'. In response, the MCU 505 may cull a mutually overlapping part of part A and part B in the combined video, such as an intersection of both parts. e.g., as indicated by an arrow labeled '14. Set culling: A+B'. At some point in time, one of the receivers, e.g., receiver A 550, may stop participating, e.g., by ceasing to stream its video stream to the MCU 505, e.g., as indicated by an arrow labeled '15. End of stream'. In response, the MCU 505 may stop adding the video of receiver A 550 in the combined video, e.g., as indicated by an arrow labeled '16. Remove Receiver A stream'. In addition, the transmission of the combined video stream 520 to receiver A 550 may be stopped, e.g., as indicated by an arrow labeled '17. Stop transmission'. Instead of continuing to cull the mutually overlapping part of part A and part B, the MCU 505 may now revert to only culling part B in the generated video, e.g., as indicated by an arrow labeled '18. Set culling: B'.

FIG. 11 shows a message exchange between an encoder system 500, an intermediary system 510 and a receiver system 550 acting as streaming client. In this example, the encoder 500 may already cull the video based on pre-existing information or data which is indicative of part(s) being occluded during display. For example, the display context may be such that the video stream is always, e.g., at each receiver, partially occluded during display. A receiver may however still signal additional occluded part(s), for example which may be specific to the display context of the particular receiver. Such signaling may be provided by the particular receiver to an intermediary system 510 between the encoder 500 and the receiver 550, which may then perform further culling, e.g., yielding a receiver-specific culled video stream.

The steps involved may be as follows. The encoder 500 may determine which part(s) of the video stream are always occluded, e.g., by each receiver. For that purpose, the encoder 500 may take scene information into account, e.g., information which is indicative how the video stream is displayed as part of a scene, e.g., as indicated by an arrow labeled '1. Determine scene'. The encoder 550 may then generate the culled video stream, e.g., as indicated by an arrow labeled '2. Generate culled stream'. A receiver 550 may then request the generated video stream. This request may be sent by the receiver 550 to the intermediary 510, e.g., as indicated by an arrow labeled '3. Request stream'. The intermediary 510 may then initialize the streaming of the generated video stream, e.g., as indicated by an arrow labeled '4. Init stream', request the generated video stream from the encoder 550, e.g., as indicated by an arrow labeled '5. Request stream', and receive the generated video stream from the encoder 550, e.g., as indicated by an arrow labeled '6. Stream'. The intermediary 510 may then use the stream obtained from the encoder 550 as a (partial) source for the stream to be generated for the receiver 550, e.g., as indicated by an arrow labeled '7. Stream Encoder data', and then stream the generated video stream to the receiver 550, e.g., as indicated by an arrow labeled '8. Stream'. During display of the generated video stream, the receiver 550 may determine that a(nother) part of the video stream is occluded, e.g., a part which is specific to the particular receiver. The receiver 550 may then signal the occluded part to the intermediary 510, e.g., as indicated by an arrow labeled '9. Signal occlusion'. In response, the intermediary 510 may adapt the generated video stream to additionally cull the occluded part, or a sub-part thereof, e.g., as indicated by an arrow labeled '10. Modify Encoder data' by which the stream obtained from the encoder 550 may be modified, and then continue to stream the updated video stream to the receiver 550, e.g., as indicated by an arrow labeled '11. Update stream'.

Figure 12:
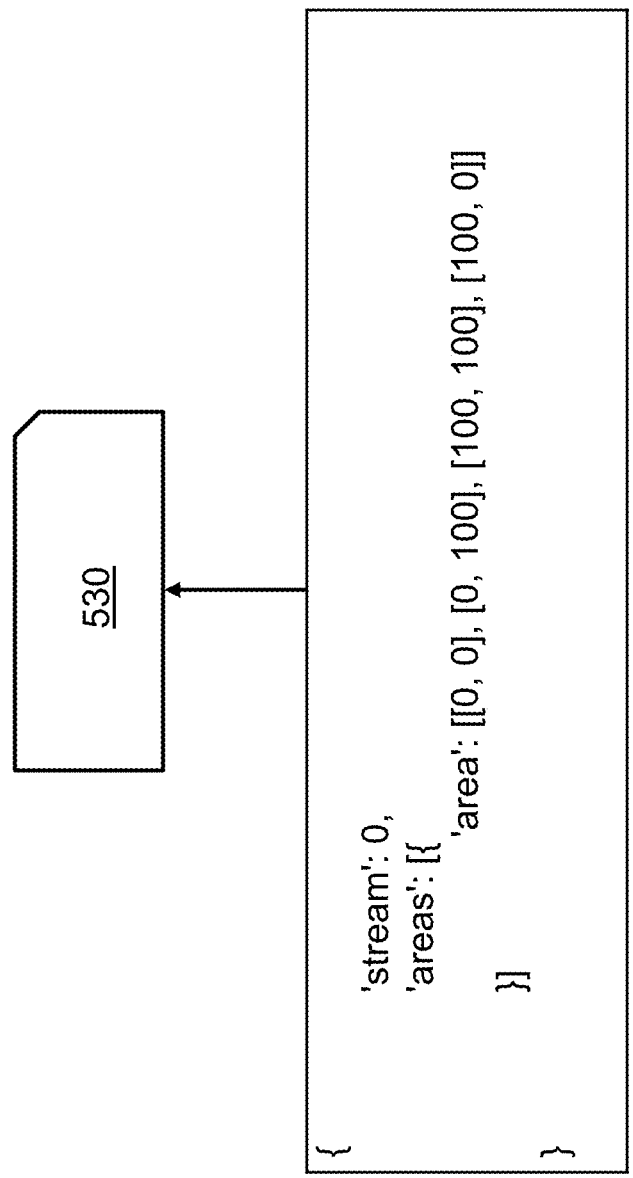
FIG. 12 shows an example of signaling data.

FIG. 12 shows an example of signaling data 530. The signaling data may contain a data structure which may define the occluded part, e.g., as a rectangular area ('bounding box') delineated by its four corners (0,0), (0, 100), (100, 100) and (100, 0). The coordinate system may be a coordinate system associated with the video, e.g., pixel or voxel coordinates, or another coordinate system which may be matched to the coordinate system of the video. In general, the signaling data may contain define a list of points or an equation, each of which may define a polygon or a mesh delineating the area or sub-volume. The equation may for example be a parameterized or non-parameterized equation. In general, the type of signaling may be selected as a compromise between the size of the signaling data and the available and/or currently selected culling technique. It will be appreciated that the signaling data 530 may also define multiple non-overlapping occluded parts, e.g., as multiple areas.

The following shows a syntax of the signaling data in the form of an ECMAScript 6 function which generates a JSON message:

```
function generateCullingMessage( ){
    const streamId = 0;
    const box_A = {
        left: 0,
        top: 0,
        right: 100,
        bottom: 100
    };
    const box_B = {
        left: 50,
        top: 0,
```

```
            right: 150,
            bottom: 100
        };
        return {
            'stream': streamId,
            'areas': [[ // [[0, 0], [0, 100], [100, 100], [100, 0]],
                    [box_A.left, box_A.top],
                    [box_A.left, box_A.bottom],
                    [box_A.right, box_A.bottom],
                    [box_A.right, box_A.top]
                ], [ // [[50, 0], [50, 100], [150, 100], [150, 0]]
                    [box_B.left, box_B.top],
                    [box_B.left, box_B.bottom],
                    [box_B.right, box_B.bottom],
                    [box_B.right, box_B.top]
                ]
            ]
        }
    }
}
```

The above message comprises the following parts:
1. A stream identifier, which allows the message to refer to an individual video stream in case there are multiple streams.
2. A list of occluded areas, which are specified as a list of points on the video which form a polygon. The last point of the polygon may be connected to the first point to form a closed surface. Here, the video coordinate system may be defined so that (0,0) is the top-left corner and (width—1, height—1) is the bottom right corner.

In the case of overlapping areas (as in the example), the union of the areas may be regarded as being occluded. In the example above, this may result in an occluded area with a width of 150 pixels instead of two occluded areas.

Such signaling may be defined as an addition to RTP RFC (specifically the RTCP part, https://tools.ietforg/html/rfc3550), but also as part of any of the existing Web standards or in any other type of standards. For example, a profile for RTP or specifically RTCP may be defined to turn the occlusion culling functionality on or off. For MPEG-DASH, the signaling may be defined as one or more event stream(s).

It will be appreciated that occlusion may not always be absolute, i.e., yes or no. Namely, many techniques are known for compositing image data, for example of a computer graphics object which is in positioned front of a video background object in a scene. For example, the image data of the foreground object and the video background object may be blended, for example using an alpha channel associated with the image data of the foreground object. Depending on the particular blend mode used in rendering the scene, occlusion may not be absolute. To cater for such scenarios, the signaling may be extended to describe partial occlusion as well.

For example, the following data structure may represent signaling data indicating that the input video is partially occluded by a 90% visible triangle:

```
{
    'stream': 0,
    'areas': [{
        'area': [[0, 0], [100, 100], [100, 0]],
        'transparency': 0.9
    }]
}
```

At the encoder system, such signaling data may be used to cull barely visible parts of the video while omitting to cull sufficiently visible occlude parts of the video. The encoder system may also reduce the encoded image quality of barely visible parts, thereby requiring fewer bits for encoding this part of the video. Depending on the blend mode, transparency may span a subset of the color components available in the video. For example, a cyan filter may obscure all colors which are not cyan, and as such, the cyan color channel of the video may be omitted in the occluded part.

The encoder system and the receiver system may be different subsystems of a same system, e.g., a single apparatus or device or a distributed system. This system may also simply be referred to as 'receiver system', in that the receiver system may contain or implement the functionality of the encoder. This integrated encoder may generate the video stream for the receiver system as an internal video stream, but also for another receiver system. For example, if two receiver systems exchange video streams, e.g., in a multiuser communication scenario, such as video conferencing, each receiver system may signal the other receiver system about occluded parts, and in response, the other receiver system may generate a culled video stream.

The encoder system may be contained in or implemented by a so-called publisher system which publishes video content, e.g., a media source or streaming server. Alternatively, the encoder system may be implemented by an intermediate system, such as an edge node of a 5G or next-gen telecommunication network, e.g., to save radio resources while being able to quickly respond to changes in occlusion in dynamic scenes, e.g. due to a moving camera and/or object. The functionality of the encoder system may also be distributed across the publisher system and the intermediate system. For example, the publisher system may cull static occluded parts, e.g., which do not or are less likely to change, and the intermediate system may cull dynamic occluded parts, e.g., which do or are more likely to change. For example, such dynamic culling may be based on data received from the receiver system which indicates a current field of view of the user. In general, the culling functionality may be implemented in a distributed manner across different systems, such that static culling is performed in advance, e.g., as a pre-processing of the video, at or nearer to the publisher system, and that dynamic culling is performed in real-time at or nearer to an edge node or similar system.

In general, the receiver system may indicate one or more characteristics of the rendering or display of the video stream to the encoder system which may be indicative of which part of the video is or would be occluded during display of the video. For example, the receiver system may indicate such characteristics to the encoder system in the form of receiver metadata, which may be an extension of, or analogous in implementation to, the receiver metadata as described in the co-pending application PCT/EP2018/067594 which is hereby incorporated by reference in as far as pertaining to the receiver metadata and the signalling of the receiver metadata. For example, a scene description may be signalled as receiver metadata, for example in the form of an Session Description Protocol (SDP) attribute, which may enable the encoder system to determine which part of the video is or would be occluded during display of the video.

In general, the culling may be performed twice for stereoscopic videos.

In general, occlusion may be detected at the receiver system, or by another entity which knows the geometry of the scene rendered by the receiver system, using known 3D graphics culling techniques. For example, a common method for performing 3D graphics culling uses a mixed GPU/CPU approach to implement the Hierarchical Z-Buffer (HZB) occlusion culling algorithm, e.g., as described in the publication "Hierarchical Z-Buffer Visibility" by Ned Greene et al., 1993. The output of the HZB occlusion culling algorithm may be regarded as a grid-based representation of the output buffer (e.g., the screen or window) where for each pixel it is indicated whether it is occluded or not. To determine whether, and if so, which parts of a video in the 3D graphics-based environment are occluded, the pixels corresponding to the bounding area (e.g., bounding box or sphere) of the video may be considered in the HZB occlusion culling algorithm, while disregarding all pixels outside this bounding area. Next, a polygon may be reconstructed of the occluded area indicated by the HZB culling algorithm (e.g. using Chan's algorithm as known from the field of computational geometry). This polygon may be used as a basis for generating the signaling data as described elsewhere in this specification, or as a part of said signaling data.

The culling of occluded parts may be combined with culling of video data which is outside of the field of view of the user, e.g., so-called view frustum culling, or with backface culling.

The culling and signaling techniques as described in this specification are applicable to light fields. Such light fields may represent a snapshot of all light rays within a given space. Within a light field, there may be light rays which may never reach a certain location from a certain angle. If an observer were to look from said location towards said angle, he/she would not be able to perceive these light rays. Moreover, when considering occlusion of the light rays from a light field by objects, only those light rays which would not arrive at the viewpoint of the user may need to be considered. As a result, such light rays may be culled from the light field video before/during streaming.

Figure 13:
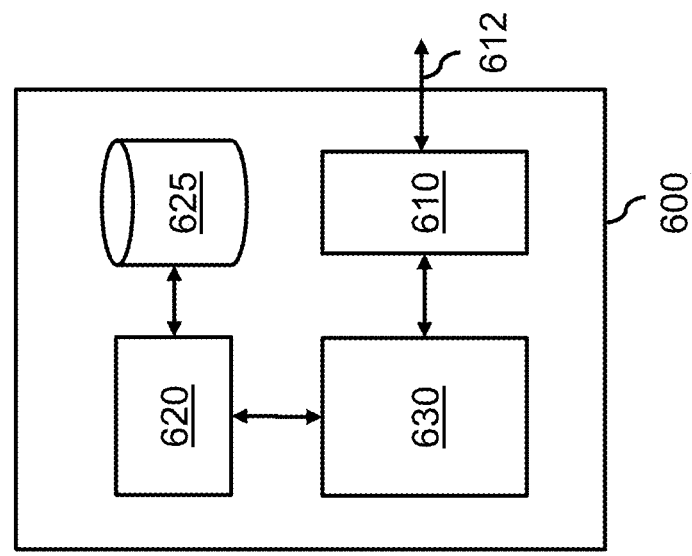
FIG. 13 shows a processor system representing an encoder system configured for generating a video stream for a streaming client.

FIG. 13 shows a processor system 600 representing an encoder system configured for generating a video stream for a streaming client. The encoder system 600 may, but does not need to, correspond to the encoder system 500 of FIGS. 7-11.

The processor system 600 is shown to comprise a processor 630 which may be configured, e.g., by hardware design or software, to perform operations described elsewhere pertaining to the generating of a culled video stream. For example, the processor 630 may be embodied by a single Central Processing Unit (CPU), but also by a combination or system of such CPUs and/or other types of processing units, e.g. one or more Graphical Processing Units. The processor system 600 is further shown to comprise an input interface 620 for accessing a video to be streamed. In the example of FIG. 13, the input interface 620 is shown to be an interface to a data storage 625, which may for example be internal memory, a hard disk, a solid-state drive, or an array thereof, and which may be used to store or buffer data such as the video. In other embodiments, the input interface 620 may be an external interface, such as an external storage interface to an external data storage or a network interface. FIG. 13 further shows the processor system 600 to comprise a communication interface 610, which may be any suitable type of communication interface via which the video stream(s) may be transmitted to streaming client(s) and via which signaling data may be received from client device(s), both types of data being indicated by reference numeral 612. For example, the communication interface 610 may be a network interface, which in turn may be a wireless network interface, e.g., based on Wi-Fi, Bluetooth, ZigBee, 4G or 5G mobile communication, or a wired network interface, e.g., based on Ethernet or optical fiber. For example, the network interface 610 may be a local area network (LAN) network interface or an interface to wide area network (WAN) such as the Internet.

It is noted that in some embodiments, the input interface 620 and the communication interface 610 may be the same interface, e.g., a network interface.

The processor system 600 may be embodied by a (single) device or apparatus. For example, the processor system 600 may be embodied by a server, network node, etc. In some embodiments, the processor system 600 may be an end-user device, for example (integrated into) a same type of device as described with reference to FIG. 14 which is configured for displaying a video stream. Examples of such devices include, but are not limited to a smartphone, personal computer, laptop, tablet device, gaming console, set-top box, television, monitor, projector, smart watch, smart glasses, media player, media recorder, head mounted display device, etc. The processor system 600 may also be embodied by a distributed system of such devices or apparatuses. An example of the latter may be the functionality of the processor system 600 being at least in part distributed over network elements in a network.

Figure 14:
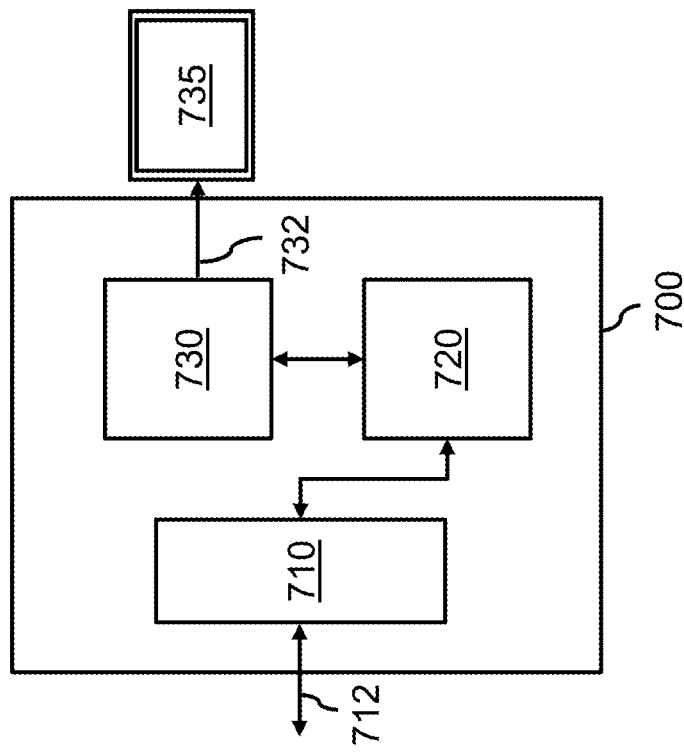
FIG. 14 shows a processor system representing a receiver system configured as a streaming client for displaying a video stream.

FIG. 14 shows a processor system 700 representing a receiver system configured as a streaming client for displaying a video stream. The processor system 700 may implement part or all of the 'displaying a video stream' and/or 'generating signaling data' functionality as described with reference to FIGS. 1-12 and elsewhere. The processor system 700 is shown to comprise a communication interface 710 which may be configured to receive the video stream and/or to transmit the signaling data, both types of data being indicated by reference numeral 712. The communication interface 710 may be any suitable type of interface for receiving and/or transmitting said data, including but not limited to a type of network interface as described with reference to FIG. 13. The processor system 700 may further comprise a processor 720 which may be configured, e.g., by hardware design or software, to perform operations described with reference to FIGS. 1-12 and elsewhere pertaining to the display of the video stream and/or the generating of the signaling data. In some embodiments, the processor 720 may directly generate and output display data 732 to a display 735 such as an HMD. In other embodiments, the processor 720 may output rendered video data which may be output to the display 735 by a separate display output 730.

The processor 720 may be embodied by a single Central Processing Unit (CPU), but also by a combination or system of such CPUs and/or other types of processing units. Although not shown in FIG. 14, the processor system 700 may also comprise a data storage, such as internal memory, a hard disk, a solid-state drive, or an array thereof, which may be used to buffer data, e.g., the received video stream and/or the signaling data which is to be transmitted. The processor system 700 may be embodied by a (single) device or apparatus. For example, the processor system 700 may be embodied as smartphone, personal computer, laptop, tablet device, gaming console, set-top box, television, monitor, projector, smart watch, smart glasses, media player, media recorder, head mounted display device, etc. The processor system 700 may also be embodied by a distributed system of such devices or apparatuses. An example of the latter may be the functionality of the processor system 700 being distributed at least in part over network elements in a network.

In general, the processor system 600 of FIG. 13 and the processor system 700 of FIG. 14 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

Figure 15:
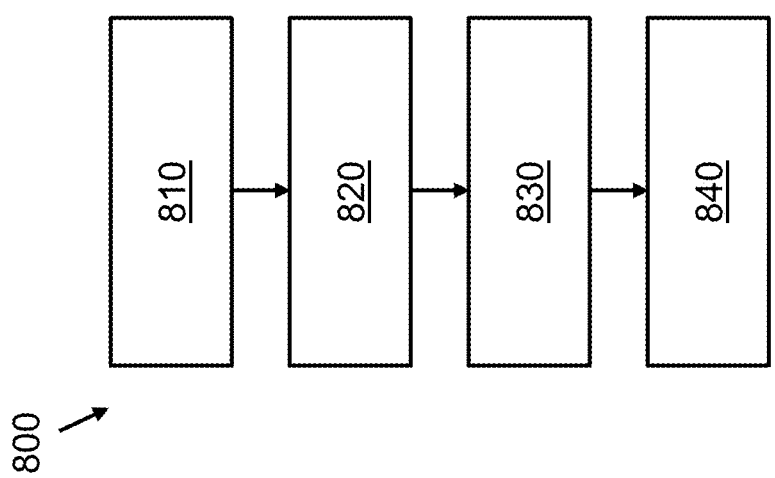
FIG. 15 shows a method for generating a video stream for a streaming client.

FIG. 15 shows a computer-implemented method 800 for generating a video stream for a streaming client. The method 800 may comprise, in a step titled "ACCESSING VIDEO TO BE STREAMED", accessing 810 the video which is to be streamed to the streaming client. The method 800 may further comprise, in a step titled "DETERMINING OCCLUDED PART OF VIDEO", determining 820 a part of the video which is or would be occluded during display of the video by the streaming client. The method 800 may further comprise, in a step titled "GENERATING VIDEO STREAM", generating 830 a video stream by, before or as part of encoding of the video, omitting the part of the video, or replacing video data in the part by replacement video data having a lower entropy than said video data. The method 840 may further comprise, in a step titled "PROVIDING VIDEO STREAM TO STREAMING CLIENT", providing the video stream to the streaming client. It is noted that the steps 820, 830 may be performed repeatedly while streaming the video stream, e.g., on a continuous or periodic basis, in that the occluded part may be redetermined during the streaming of the video stream and in that the video stream may be adjusted correspondingly.

Figure 16:
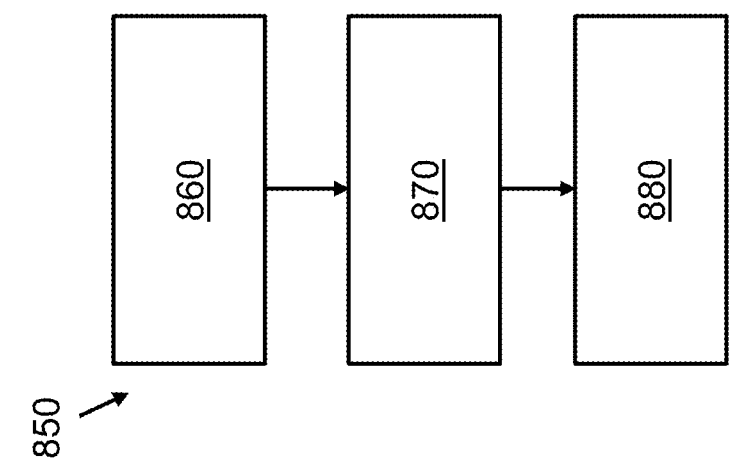
FIG. 16 shows a method for displaying the video stream.

FIG. 16 shows a computer-implemented method 850 for displaying a video stream. The method 850 may comprise, in a step titled "DETERMINING OCCLUDED PART OF VIDEO", determining 860 a part of the video which is or would be occluded during display of the video. The method 850 may further comprise, in a step titled "PROVIDING SIGNALING TO ENCODER SYSTEM", providing 870 signaling data to an encoder system which is indicative of the part of the video to be occluded during display of the video. The method 850 may further comprise, in a step titled "RECEIVING VIDEO STREAM", receiving 880 a video stream from the encoder system in which the part of the video has been omitted, or video data of the part has been replaced by replacement video data having a lower entropy than said video data. Although not separately shown, the method 850 may further comprise displaying the video stream. It will be appreciated that the steps 860, 870 may be performed before or while receiving a video stream. If the steps 860, 870 are performed while receiving a video stream, said steps may result in the encoder system adjusting video stream so that a video stream is received in which the occluded part has been culled.

Figure 17:
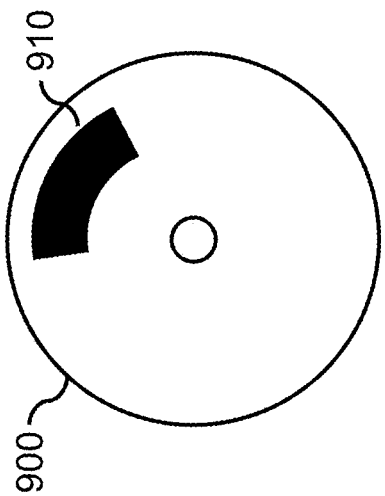
FIG. 17 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 950 as for example shown in FIG. 17, e.g., in the form of a series 960 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 17 shows by way of example an optical storage device 950.

In an alternative embodiment of the computer readable medium 950 of FIG. 17, the computer readable medium 950 may comprise transitory or non-transitory data 960 represent the signaling data described elsewhere in this specification.

Figure 18:
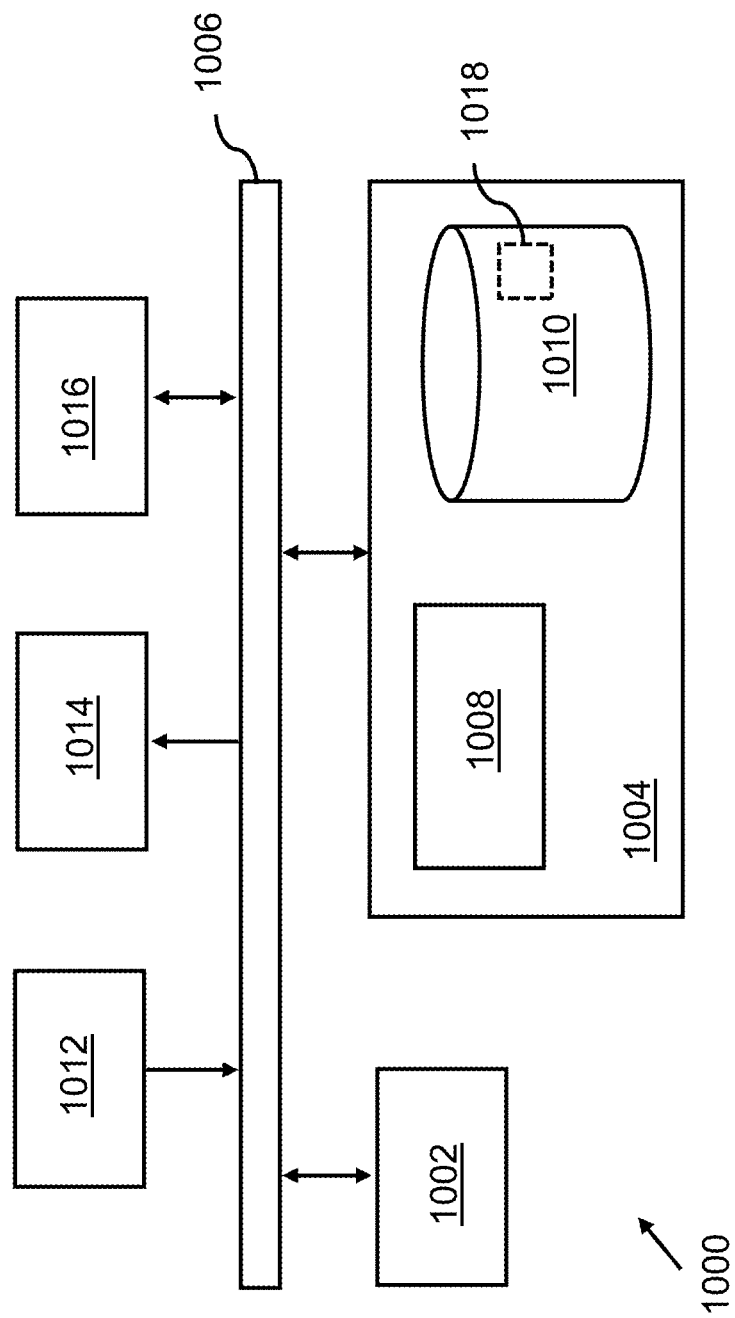
FIG. 18 shows an exemplary data processing system.

FIG. 18 is a block diagram illustrating an exemplary data processing system 1000 that may be used in the embodiments described in this specification. Such data processing systems include data processing entities described in this specification, including but not limited to the encoder systems, receiver systems, processor systems as described with reference to FIGS. 1-17 and elsewhere, and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 18, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent an encoder system as described with reference to FIG. 13 and elsewhere. In that case, application 1018 may represent an application that, when executed, configures data processing system 1000 to perform the functions described with reference to said entity.

In another example, data processing system 1000 may represent a receiver system or a streaming client as described with reference to FIG. 14 and elsewhere. In that case, application 1018 may represent an application that, when executed, configures data processing system 1000 to perform the functions described with reference to said entity.

In accordance with an abstract of the present specification, an encoder system and computer-implemented method may be provided for generating a video stream for a streaming client. The system and method may determine a part of the video which is or would be occluded during display of the video by the streaming client, for example on the basis of signaling data received from the streaming client. A video stream may be generated by, before or as part of encoding of the video, omitting the part of the video, or replacing video data in the part by replacement video data having a lower entropy than said video data. The video stream may be provided to the streaming client, for example via a network. Accordingly, a better compressible version of the video may be obtained, which when displayed by the streaming client, may still contain all or most non-occluded parts visible to a user.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. An encoder system for generating a video stream for a streaming client, the encoder system comprising:
   a communication interface to the streaming client;
   an input interface for accessing the video which is to be streamed to the streaming client; and
   a processor configured to:
   via the communication interface, obtain signaling data which is indicative of a part of the video which is or would be occluded by another video or a computer-graphics based object during display of the video;
   determine the part of the video which is or would be occluded during display of the video by the streaming client based on the signaling data;
   generate a video stream by, before or as part of encoding of the video, i) omitting the part of the video, or ii) replacing video data in the part by replacement video data having a lower entropy than said video data; and
   via the communication interface, provide the video stream to the streaming client, wherein, as provided from the encoder system, the part of the video which is or would be occluded during display of the video by the streaming client, i) is omitted from the video stream, or ii) the video data in the part of the video which is or would be occluded during display of the video by the streaming client is replaced by the replacement video data.

2. The encoder system according to claim 1, wherein the signaling data is received from the streaming client, or from a processor system which at least in part determines the display of the video by the streaming client.

3. A receiver system representing a streaming client for displaying a streamed video, the receiver system comprising:
   a communication interface;
   a processor configured to:
   determine a part of the video which is or would be occluded by another video or a computer-graphics based object during display of the video;
   and via the communication interface:
   provide signaling data to an encoder system which is indicative of the part of the video which is or would be occluded during display of the video; and
   receive a video stream from the encoder system in which i) the part of the video which is or would be occluded during display of the video has been omitted by the encoder system, or ii) video data of the part which is or would be occluded during display of the video has been replaced by replacement video data having a lower entropy than said video data by the encoder system.

4. A computer-implemented method for generating a video stream for a streaming client by an encoder system, the method comprising:
   accessing the video which is to be streamed to the streaming client;
   obtaining signaling data which is indicative of a part of the video which is or would be occluded by another video or a computer-graphics based object during display of the video;
   determining the part of the video which is or would be occluded during display of the video by the streaming client based on the signaling data;
   generating a video stream by, before or as part of encoding of the video, i) omitting the part of the video, or ii) replacing video data in the part by replacement video data having a lower entropy than said video data; and
   providing the video stream to the streaming client, wherein, as provided from the encoder system, the part of the video which is or would be occluded during display of the video by the streaming client, i) is omitted from the video stream, or ii) the video data in the part of the video which is or would be occluded during display of the video by the streaming client is replaced by the replacement video data.

5. A computer-implemented method for displaying a streamed video, the method comprising:
   determining a part of the video which is or would be occluded by another video or a computer-graphics based object during display of the video;

providing signaling data to an encoder system which is indicative of the part of the video to be occluded during display of the video; and receiving a video stream from the encoder system in which i) the part of the video which is or would be occluded during display of the video has been omitted by the encoder system, or ii) video data of the part which is would be occluded during display of the video has been replaced by replacement video data having a lower entropy than said video data by the encoder system.

6. A non-transitory computer-readable medium comprising a computer program, the computer program comprising instructions for causing a processor system to perform the method according to claim 4.

* * * * *